US010233319B2

(12) United States Patent
Galizio et al.

(10) Patent No.: US 10,233,319 B2
(45) Date of Patent: *Mar. 19, 2019

(54) RUBBER COMPOSITIONS CONTAINING WHEY PROTEIN

(71) Applicant: Bridgestone Americas Tire Operations, LLC, Nashville, TN (US)

(72) Inventors: Benjamin C. Galizio, Kent, OH (US); Amy M. Randall, Akron, OH (US); Melissa M. Clark, Woodland Park, CO (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/536,729

(22) PCT Filed: Jun. 11, 2015

(86) PCT No.: PCT/US2015/035258
§ 371 (c)(1),
(2) Date: Jun. 16, 2017

(87) PCT Pub. No.: WO2016/099598
PCT Pub. Date: Jun. 23, 2016

(65) Prior Publication Data
US 2017/0342252 A1    Nov. 30, 2017

Related U.S. Application Data

(60) Provisional application No. 62/093,608, filed on Dec. 18, 2014.

(51) Int. Cl.
| | |
|---|---|
| *C08L 23/28* | (2006.01) |
| *B60C 1/00* | (2006.01) |
| *C08K 3/04* | (2006.01) |
| *C08K 3/34* | (2006.01) |
| *C08K 3/36* | (2006.01) |
| *C08L 9/00* | (2006.01) |
| *C08L 21/00* | (2006.01) |
| *C08L 89/00* | (2006.01) |
| *C08L 9/06* | (2006.01) |

(52) U.S. Cl.
CPC .......... *C08L 23/283* (2013.01); *B60C 1/0016* (2013.01); *B60C 1/0025* (2013.01); *C08K 3/04* (2013.01); *C08K 3/346* (2013.01); *C08K 3/36* (2013.01); *C08L 9/00* (2013.01); *C08L 9/06* (2013.01); *C08L 21/00* (2013.01); *C08L 89/00* (2013.01)

(58) Field of Classification Search
CPC ........ C08L 23/283; C08L 89/00; C08L 21/00; C08L 9/00; C08K 3/04; C08K 3/36; C08K 3/346
USPC ......................................................... 524/17
See application file for complete search history.

(56) References Cited

U.S. PATENT DOCUMENTS

| | | |
|---|---|---|
| 2,098,037 A | 11/1937 | Hazell et al. |
| 2,098,038 A | 11/1937 | Hazell et al. |
| 2,127,560 A | 8/1938 | Haslam |
| 2,931,845 A | 4/1960 | Rene et al. |
| 3,113,605 A | 12/1963 | Feutterer |
| 5,272,190 A | 12/1993 | Haruki et al. |
| 5,302,636 A | 4/1994 | Hiroshi et al. |
| 6,780,925 B2 | 8/2004 | Materne et al. |
| 6,835,769 B2 | 12/2004 | Custodero et al. |
| 2002/0004549 A1 | 1/2002 | Custodero et al. |
| 2003/0100643 A1 | 5/2003 | Kikuchi |
| 2003/0135006 A1 | 7/2003 | Thierry et al. |
| 2004/0030028 A1 | 2/2004 | Resendes et al. |
| 2005/0075422 A1 | 4/2005 | Resendes et al. |
| 2005/0085582 A1 | 4/2005 | Galimbreti et al. |
| 2005/0277712 A1 | 12/2005 | Glendon |
| 2006/0252879 A1 | 11/2006 | Yasuyuki et al. |
| 2008/0108733 A1 | 5/2008 | Howard et al. |
| 2008/0236716 A1 | 10/2008 | Bergman et al. |
| 2009/0232876 A1 | 9/2009 | Montes et al. |
| 2012/0183794 A1 | 7/2012 | Guo et al. |
| 2013/0150498 A1* | 6/2013 | Basu .................. C08L 1/12 524/40 |
| 2013/0263520 A1 | 10/2013 | Houga et al. |
| 2013/0312890 A1 | 11/2013 | Iwata et al. |
| 2015/0159001 A1* | 6/2015 | Qu ..................... C08L 7/02 525/132 |

FOREIGN PATENT DOCUMENTS

| | | |
|---|---|---|
| CN | 101240049 A | 8/2008 |
| CN | 101967239 A | 2/2011 |

(Continued)

OTHER PUBLICATIONS

Wikipedia, Whey Protein, Jun. 4, 2018. (Year: 2018).*
Alder-Nissen, Jens, "Determination of the Degree of Hydrolysis of Food Protein Hydrolysates by Trinitrobenzenesulfonic acid," J. Agric. Food Chem., vol. 27, No. 6, pp. 1256-1262 (1979).
Section 7.2 (Titanium Dioxide) from Basic Rubber Testing: Selecting Methods for a Rubber Test Program, editor John S. Dick, 2003.
Etzel, Mark R., "Manufacture and Use of Dairy Protein Fractions," J. of Nutrition, vol. 134, No. 4, pp. 9965-10025 (2004).
Fitzgerald, Richard J. et al., "Hypotensive Peptides from Milk Proteins," J. of Nutrition, vol. 134, No. 4, pp. 980S-998S (2004).
GNC Pro Performance 100% Whey Protein—Vanilla Cream, downloaded Jun. 10, 2014.
Hoogwegt U.S. Inc., Acid Whey Protein, downloaded Jun. 25, 2014 (1 page).

(Continued)

*Primary Examiner* — Hui H Chin
(74) *Attorney, Agent, or Firm* — Meredith E. Hooker; Jenny Sheaffer

(57) ABSTRACT

The present disclosure is directed to rubber compositions comprising a conjugated diene rubber, a reinforcing silica filler, and a whey protein component. The whey protein component is in an amount sufficient to provide about 0.1 to about 10 phr whey protein. The present disclosure is also directed to methods of preparing such rubber compositions and to tire components containing the rubber compositions disclosed herein.

17 Claims, No Drawings

(56) References Cited

FOREIGN PATENT DOCUMENTS

| | | | |
|---|---|---|---|
| CN | 103772532 A | 5/2014 |
| DE | 19622169 A1 | 12/1996 |
| EP | 1234852 A1 | 6/2013 |
| EP | 2604651 A1 | 6/2013 |
| GB | 754939 A | 8/1956 |
| GB | 766509 A | 1/1957 |
| JP | S58-087141 A | 5/1983 |
| JP | H06-166771 A | 6/1994 |
| JP | 2000038477 A | 2/2000 |
| JP | 2002-249987 A | 9/2002 |
| JP | 2009-029991 A | 9/2009 |
| JP | 2014-062269 A | 4/2014 |
| WO | 03037655 A1 | 5/2003 |
| WO | 2010016466 A1 | 2/2010 |
| WO | 2013023229 A1 | 2/2013 |
| WO | 2013081138 A1 | 6/2013 |
| WO | 2013092095 A1 | 6/2013 |
| WO | 2014036758 A1 | 3/2014 |

OTHER PUBLICATIONS

Hoogwegt U.S. Inc., Reduced Lactose Whey Protein, downloaded Jun. 25, 2014 (1 page).
Hoogwegt U.S. Inc., Reduced Minerals Whey Protein, downloaded Jun. 25, 2014 (1 page).
Hoogwegt U.S. Inc., Sweet Whey Powder, downloaded Jun. 25, 2014 (1 page).
Hoogwegt U.S. Inc., Whey Protein Concentrate, downloaded Jun. 25, 2014 (1 page).
Hoogwegt U.S., Inc., Whey Protein Isolate, downloaded Jun. 25, 2014 (1 page).
Jong, L., "Effect of Soy Protein Concentrate in Elastomer Composites," Composites Part A: Applied Science and Manufacturing, vol. 37, issue 3, Mar. 2006, pp. 438-446.
Jong, Lei, Characterization of Soy Protein/Styrene-Butadiene Rubber Composites, Composites Part A: Applied Science and Manufacturing, vol. 36, issue 5, May 2005, pp. 675-682.
Chapter 7 (title: Nonfood Applications of Milk Proteins: A Review), from Colloids in Biotechnology, by Kalicka et al., 2010.
Kronos 1000, titanium dioxide, copyright 2014.
Milk Facts, downloaded Jun. 9, 2014 (4 pages).
Burrington, Kimberlee (K.J.), Technical Report Milk Fractionation Technology and Emerging Milk Protein Opportunities, copyright 2013 (8 pages).
Morias et al., "Correlation between the Degree of Hydrolysis and the Peptide Profile of Whey Protein Concentrate Hydrolysates: Effect of the Enzyme Type and Reaction Time," Am. J. Food Tech., vol. 8, issue 1, pp. 1-16, 2013.
Sarkawi, S.S., et al., "The Influence of Non-Rubber Constituents on Performance of Silica Reinforced Natural Rubber Compounds," European Polymer Journal, vol. 48, issue 10, Oct. 2013, pp. 3199-3209.
Titanium Oxide, Wikipedia, downloaded Jun. 1, 2015 (2 pages).
International Search Report and Written Opinion from PCT application No. PCT/US2015/064509, dated Apr. 20, 2016 (12 pages).
International Search Report and Written Opinion from PCT application No. PCT/US2015/035258, dated Sep. 15, 2015 (11 pages).
International Search Report and Written Opinion from PCT application No. PCT/US2015/035255, dated Sep. 15, 2015 (12 pages).
International Search Report and Written Opinion from PCT application No. PCT/US2015/035264, dated Sep. 14, 2015 (10 pages).
Han, X.Q. et al., Journal of Agricultural and Food Chemistry, vol. 44, No. 5, pp. 1211-1217 (1996).
Goodall, S., et al., "Selective Separation of the Major Whey Proteins Using Ion Exchange Membranes," J. of Dairy Science, vol. 91, pp. 1-10 (2008).
Sharma, Suraj et al., "Whey Based Binary Bioplastics," J. of Food Eng., vol. 119, pp. 404-410 (2013).
Bhattacharya, Amit, Polymer Grafting and Crosslinking, copyright 2009, screen shot of excerpt (first paragraph only) of p. 48.
Nocil Limiited, Vulcanization & Accelerators, Dec. 2010, downloaded from http://nocil.com/Downloadfile/OTechnicalNote-Vulcanization-Dec10.pdf.
International Preliminary Report on Patentability from PCT application No. PCT/US2015/064509, dated Jun. 20, 2017 (9 pages).
International Preliminary Report on Patentability from PCT application No. PCT/US2015/035258, dated Jun. 20, 2017 (8 pages).
International Preliminary Report on Patentability from PCT application No. PCT/US2015/035255, dated Jun. 21, 2017 (9 pages).
International Preliminary Report on Patentabilityfrom PCT application No. PCT/US2015/035264, dated Jun. 21, 2017 (7 pages).
Morr, C.V., Whey and Lactose Processing, edited by J. G. Zadow, Chapter 4, "Whey Utilization," pp. 133-143, copyright 1992.
Hudson, H.M., et al., "Rheological and Physical Properties of Derivitized Whey Protein Isolate Powders," J. Agric. Food Chemistry, vol. 48, pp. 3112-3119, 2000.
European Search Report and Opinion from EP application No. 15870496.5 with EP communication dated May 4, 2018.
Office action from U.S. Appl. No. 14/736,709 dated May 2016.
Office action from U.S. Appl. No. 14/736,709 dated Sep. 2016.
Office action from U.S. Appl. No. 14/736,709 dated Mar. 2017.
Office action from U.S. Appl. No. 14/736,709 dated Jul. 2017.
Office action from U.S. Appl. No. 14/736,709 dated Sep. 2017.
Office action from U.S. Appl. No. 14/736,709 dated Feb. 2018.
Office action from U.S. Appl. No. 14/736,709 dated Aug. 2018.
Response filed in U.S. Appl. No. 14/736,709 dated Aug. 2016.
Response filed in U.S. Appl. No. 14/736,709 dated Dec. 2016.
Response filed in U.S. Appl. No. 14/736,709 dated Jun. 2017.
Response filed in U.S. Appl. No. 14/736,709 dated Sep. 2017.
Response filed in U.S. Appl. No. 14/736,709 dated Jan. 2018.
Response filed in U.S. Appl. No. 14/736,709 dated Jun. 2018.
Response filed in U.S. Appl. No. 14/736,709 dated Oct. 2018.
Office action from U.S. Appl. No. 15/537,043 dated Jul. 2018.
Response filed in U.S. Appl. No. 15/537,043 dated Oct. 2018.
Eastman Cellulose-Based Specialty Polymers, Oct. 2014 (32 pages).
International Institute of Synthetic Rubber Products, Inc., "Butyl Rubber", downloaded on Jun. 1, 2015 from https://iisrp.com/wp-content/uploads/02ButylRubberIIR16Aug2012.pdf (5 pages).

* cited by examiner

RUBBER COMPOSITIONS CONTAINING WHEY PROTEIN

FIELD OF THE DISCLOSURE

The present disclosure relates to rubber compositions comprising at least one rubber, a reinforcing silica filler and a whey protein component, and to related methods. The present disclosure also relates to tire components containing the rubber compositions disclosed herein.

BACKGROUND

Rubber compositions for vehicles tires frequently use reinforcing fillers, such as silica, to impart desirable properties such as abrasion resistance and rolling resistance. However, silica fillers can agglomerate (during mixing) in rubber compositions, which causes the viscosity of the composition to increase. Increased viscosity makes the rubber composition more difficult to process.

SUMMARY OF THE INVENTION

Disclosed herein are rubber compositions comprising at least one rubber, a reinforcing silica filler and a whey protein component, and related methods. Also disclosed are tire components containing the rubber compositions disclosed herein.

In a first embodiment, a rubber composition comprising at least one rubber, a reinforcing silica filler, and a whey protein component is disclosed. The rubber composition comprises about 5 to about 200 phr of the reinforcing silica filler, and the whey protein component is present in an amount sufficient to provide about 0.1 to about 10 phr of whey protein.

In a second embodiment, a rubber composition that has been subjected to curing is disclosed; the composition comprises at least one rubber, a reinforcing silica filler, whey protein, and a cure package. The rubber composition comprises about 5 to about 200 phr of the reinforcing silica filler, and the whey protein is present in an amount of about 0.1 to about 10 phr.

In a third embodiment, a method for reducing the viscosity of a silica-filler-containing rubber composition is disclosed. The method comprises the use of a rubber composition comprising at least one rubber, about 5 to 200 phr of a reinforcing silica filler, and a whey protein component in an amount sufficient to provide about 0.1 to about 10 phr of whey protein.

DETAILED DESCRIPTION

Disclosed herein are rubber compositions comprising at least one rubber, a reinforcing silica filler and a whey protein component, and related methods. Also disclosed herein are tire components containing the rubber compositions disclosed herein.

In a first embodiment, a rubber composition comprising at least one rubber, a reinforcing silica filler, and a whey protein component is disclosed. The rubber composition comprises about 5 to about 200 phr of the reinforcing silica filler, and the whey protein component is present in an amount sufficient to provide about 0.1 to about 10 phr of whey protein.

In a second embodiment, a rubber composition that has been subjected to curing is disclosed; the composition comprises at least one rubber, a reinforcing silica filler, whey protein, and a cure package. The rubber composition comprises about 5 to about 200 phr of the reinforcing silica filler, and the whey protein is present in an amount of about 0.1 to about 10 phr.

In a third embodiment, a method for reducing the viscosity of a silica-filler-containing rubber composition is disclosed. The method comprises the use of a rubber composition comprising at least one rubber, about 5 to 200 phr of a reinforcing silica filler, and a whey protein component in an amount sufficient to provide about 0.1 to about 10 phr of whey protein.

Definitions

The terminology as set forth herein is for description of the embodiments only and should not be construed as limiting the invention as a whole.

As used herein, the term "phr" means the parts by weight of rubber. If the rubber composition comprises more than one rubber, "phr" means the parts by weight per hundred parts of the sum of all rubbers.

As used herein, the term "polybutadiene" is used to indicate a polymer that is manufactured from cis-1,3-butadiene monomers. The term polybutadiene is also used interchangeably with the phrase "polybutadiene rubber" and the abbreviation "BR."

As used herein, the term "polyisoprene" means synthetic polyisoprene. In other words, the term is used to indicate a polymer that is manufactured from isoprene monomers, and should not be construed as including naturally occurring natural rubber (e.g., Hevea natural rubber, guayule-sourced natural rubber or dandelion-sourced natural rubber). The term polyisoprene is also used interchangeably with the phrase "polyisoprene rubber" and the abbreviation "IR."

As used herein, the term "styrene-butadiene rubber" or "SBR" means a copolymer manufactured from styrene and cis-1,3-butadiene monomers.

As used herein, the term "natural rubber" or "NR" means naturally occurring rubber such as can be harvested from sources such as Hevea rubber trees, and non-Hevea source (e.g., guayule shrubs, and dandelions (e.g., TKS)). In other words, the term "natural rubber" should not be construed as including polyisoprene.

As used herein, the term "whey protein component" means a component which contains whey protein, but which also may include other materials such as water, minerals, fats, carbohydrates, etc.

As used herein, the term "majority" means at least 51% by weight.

As used herein, the term "minority" means less than 50% by weight.

For the purpose of this disclosure, any reference to a percent amount of a component in the rubber composition means a percent by weight, unless otherwise specified. Similarly, any reference to ratios of component amounts in the rubber composition means the ratios by weight, unless otherwise specified. Unless stated to the contrary, discussions herein relating to the components and amounts of the rubber compositions of the present disclosure should be understood to apply equally to the other embodiments, e.g., the related methods and the tires (and tire treads) containing the rubber compositions disclosed herein.

Whey Protein Component and Whey Protein

As discussed above, according to the first and second embodiments disclosed herein, the rubber composition comprises a whey protein component and according to the second embodiments disclosed herein, the rubber composition comprises whey protein. As discussed in more detail below, the whey protein component is the source of whey protein in the resulting rubber composition.

Whey protein and casein protein are two types of protein found in milk (i.e., milk from cows, goats, sheep, humans, or other mammals). Whey protein refers generally to a group of milk proteins that remain soluble when liquid milk is acidified to a pH of 4.6 or lower. Casein proteins are the milk proteins that coagulate at acidic pH to become cheese, yogurt, or another solidified or semi-solidified milk product. After the coagulated casein protein solids are removed from acidified milk, the remaining liquid is referred to as whey; the whey typically contains whey protein along with varying amounts of carbohydrates (e.g., lactose), fats, and minerals.

Whey protein is a collection of globular proteins, which includes proteins such as alpha-lactalbumin, beta-lactoglobulin, immunoglobulin, and bovine serum albumin; while whey protein comprises a collection of proteins, for ease of reference it is referred to herein as "whey protein" in the singular. The combination of alpha-lactalbumin and beta-lactoglobulin comprise the majority of the proteins in whey protein from cow's milk, comprising about 25% and 65%, respectively, by weight of the protein. Although whey protein may comprise very minor amounts of individual amino acids or short-chain protein oligomers, the majority (i.e., more than 50%, including more than 75%, more than 90%, or even more than 95%) of the protein chains in whey protein have a molecular weight greater than about 10 kDaltons (measured by a method such as gel electrophoresis). In certain embodiments of the first-third embodiments disclosed herein, the protein chains of the whey protein used in the rubber composition (or contained in the whey protein component) have a degree of hydrolysis that is less than about 50%. The degree of hydrolysis ("DH") is the percentage of peptide bonds cleaved when a protein is hydrolyzed to break the protein chain into shorter chains or individual amino acids. DH can be measured by any of several known methods, including pH stat measurement, trinitrobenzenesulfonic acid (TNBS) reaction, ortho-phthaldialdehyde (OPA) reaction, and formol titration. In certain embodiments of the first-third embodiments disclosed herein, the whey protein used in the rubber composition (or contained in the whey protein component) has a DH that is less than about 30%, including less than 30%, less than about 25%, less than 25%, less than about 20%, less than 20%, less than about 15%, less than 15%, less than about 10%, less than 10%, less than about 5%, less than 5%, less than about 3%, and less than 3% DH. In certain embodiments according to the first-third embodiments disclosed herein, the whey protein in the whey protein component meets at least one of the preceding attributes relating to DH.

All proteins are comprised of building blocks of amino acids. The protein chains of whey protein contain a relatively high percentage of branched-chain amino acids (BCAAs), particularly leucine. Due to the amino acid profile of whey protein, it contains significant amounts of sulfur, but no phosphate (phosphorus). Thus, in certain embodiments, the whey protein component used in the rubber compositions or the whey protein contained in the rubber compositions according to the first-third embodiments can be described as phosphate (or phosphorus) free. Casein protein, in contrast, has a different amino acid profile and comprises primarily alpha-caseins, beta-casein, and kappa-casein. Due to the amino acid profile of casein protein, it contains significant amounts of phosphate (phosphorus), but little sulfur.

Whey with a pH of about 5.1 or greater is called "sweet whey," and is a byproduct of hard cheese production. Sweet whey protein is commercially valuable for making ricotta cheese and as an animal feed or fertilizer. However, the whey that results from making soft cheese, cottage cheese, and yogurt typically has a pH less than 5.1. This so-called "acid whey" and the acid whey protein in it have traditionally had little commercial value.

When whey is first separated from milk, the whey is mostly water (e.g., greater than about 90% water by weight), but it also contains whey proteins, fats, carbohydrates (e.g., lactose), minerals (e.g., calcium), and other milk-based materials (e.g., cholesterol). Thus, for the purpose of this disclosure, whey may be considered a whey protein component. However, the high aqueous content of most whey and its relatively low protein content (generally less than 1%) makes its use as a whey protein component in the rubber compositions according to the first-third embodiments disclosed herein possible, although less preferred. To make a more practical whey protein component for use in the rubber compositions (or source of whey protein) according to the first-third embodiments disclosed herein, the whey may be processed to remove some or all of the water, increase the concentration of the whey proteins, remove non-protein materials, or combinations of the foregoing. Such processed forms of whey are commercially available and may be sold under names including acid whey powder, reduced lactose whey, reduced minerals whey, sweet whey powder, whey powder concentrate, and whey protein isolate. Accordingly, in certain embodiments of the first-third embodiments disclosed herein the whey protein component comprises (or the whey protein is sourced from) at least one of acid whey powder, reduced lactose whey, reduced minerals whey, sweet whey powder, whey protein concentrate, and whey protein isolate. In certain of the foregoing embodiments, the whey protein component (or whey protein) is sourced from cow's milk (due to the general prevalence of cow's milk), and in other embodiments it is sourced from a non-human animal.

In certain embodiments according to the first-third embodiments disclosed herein, the whey protein component (or source of the whey protein) comprises a powder (i.e., whey powder). Whey powder may be formed by drying liquid whey (i.e., acid whey or sweet whey) to a solid, scoopable powder (i.e., acid whey powder or sweet whey powder). Whey powder may still have some residual water in the composition, but is essentially a dry powder when used as a whey protein component. In certain embodiments according to the first-third embodiments disclosed herein, the whey protein component (or source of the whey protein) comprises acid whey powder, sweet whey powder, or a combination thereof. In certain such embodiments, the acid whey powder comprises about 10 to about 15% by weight protein. In another embodiment of the first-third embodiments disclosed herein, the whey protein component (or source of the whey protein) comprises reduced lactose whey. Reduced lactose whey may be formed by treating liquid whey to remove some or all of the water and lactose to form reduced lactose whey. In certain embodiments of the first-third embodiments disclosed herein, the reduced lactose whey comprises about 15 to about 30% by weight (including 15 to 30% by weight) protein. In another embodiment of the first-third embodiments disclosed herein, the whey protein component (or source of the whey protein) comprises reduced minerals whey. Reduced minerals whey may be formed by treating liquid whey to remove some or all of the water and minerals (e.g., calcium) to form reduced minerals whey. In certain embodiments of the first-third embodiments disclosed herein, the reduced minerals whey comprises about 10 to about 15% by weight protein (including 10 to 15% by weight). In another embodiment of the first-third embodiments disclosed herein, the whey protein component (or source of the whey protein) comprises whey protein concentrate (WPC). WPC may be formed by treating liquid whey to remove a significant portion of the water. WPC may still have other milk components (e.g., fats, lactose, minerals, etc.) present in significant amounts. In certain embodiments of the first-third embodiments disclosed herein, the WPC comprises about 30 to about 85% by weight (including 30 to 85% by weight) protein. In another embodiment of the first-third embodiments disclosed herein, the whey protein component (or source of the whey protein) comprises whey protein isolate (WPI). WPI may be formed by treating liquid whey to remove much of the water, fat, lactose, and other non-protein components. In certain embodiments of the first-third embodiments disclosed herein, the WPI comprises at least about 90% protein by weight (including at least 90% protein by weight).

As discussed above, according to the first-third embodiments disclosed herein, the rubber composition comprises a whey protein component (or a source of whey protein) in an amount sufficient to provide about 0.1 to about 10 phr whey protein in the rubber composition. In certain such embodiments, the whey protein component is present in an amount sufficient to provide 0.1 to 10 phr (e.g., 0.1 phr, 0.2 phr, 0.25 phr, 0.3 phr, 0.4 phr, 0.5 phr, 1 phr, 2 phr, 3 phr, 4 phr, 5 phr, 6 phr, 7 phr, 8 phr, 9 phr, 10 phr) of whey protein in the rubber composition, including about 0.2 to about 9 phr, including 0.2 to 9 phr, including about 0.25 to about 8 phr, including 0.25 phr to 8 phr, including about 0.3 to about 7 phr, including 0.3 to 7 phr, including about 0.4 to about 6 phr, including 0.4 to 6 phr, including about 0.5 to about 5 phr, and including 0.5 to 5 phr whey protein in the rubber composition. The amount of whey protein component needed to provide the foregoing amounts of whey protein will vary depending upon the concentration of whey protein in the respective whey protein component As discussed above, in certain embodiments according to the first-third embodiments disclosed herein, sources for the whey protein component used in the rubber composition (and, accordingly, the whey protein contained in the rubber composition) include manufacturers of acid whey-based dairy products, such as producers of Greek yogurt, cottage cheese, and other soft cheeses. In certain embodiments of the first-third embodiments disclosed herein, sources for the whey protein component used in the rubber composition (and, accordingly, the whey protein contained in the rubber composition) include commercial whey protein products, including but not limited to acid whey powder, sweet whey powder, reduced lactose whey, reduced minerals whey, WPC, WPI, and combinations thereof.

Polymers (Rubbers)

As discussed above, according to the first-third embodiments disclosed herein, the rubber composition comprises at least one rubber. These rubber compositions can be understood as comprising 100 parts of rubber (100 phr), which includes at least one rubber. The at least one rubber can be selected from natural rubber, synthetic rubber, or combinations thereof. Suitable rubbers for use in the rubber composition are well known to those skilled in the art and include but are not limited to the following: synthetic polyisoprene rubber, natural rubber, styrene-butadiene rubber (SBR), styrene-isoprene rubber, butadiene-isoprene-rubber, styrene-isoprene-butadiene rubber, polybutadiene, butyl rubber (both halogenated and non-halogenated), neoprene (polychloroprene), ethylene-propylene rubber, ethylene-propylene-diene rubber (EPDM), acrylonitrile-butadiene rubber (NBR), silicone rubber, fluorinated rubber, polyacrylate rubber (copolymer of acrylate monomer and vinyl ether), ethylene acrylic rubber, ethylene vinyl acetate copolymer (EVA), epichlorohydrin rubbers, chlorinated polyethylene rubbers, chlorosulfonated polyethylene rubbers, nitrile rubber, halogenated nitrile rubber, hydrogenated nitrile rubber, tetrafluoroethylene-propylene rubber, and combinations thereof. Examples of fluorinated rubber include perfluoroelastomer rubber, fluoroelastomer, fluorosilicone, and tetrafluoroethylene-propylene rubber.

In certain embodiments of the first-third embodiments disclosed herein, at least a majority (by weight) of the at least one rubber comprises at least one of: natural rubber, polyisoprene rubber, polybutadiene rubber, and styrene-butadiene rubber; in such embodiments, one or more than one type of any of the foregoing rubbers can be utilized. In certain embodiments, at least 60% by weight (at least 60 parts or phr), at least 70% by weight (at least 70 parts or phr), at least 80% by weight (at least 80 parts or phr), at least 90% by weight (at least 90 parts or phr), at least 95% by weight (at least 95 parts or phr), or even 100% by weight (100 parts or phr) of the rubber comprises at least one of: natural rubber, synthetic polyisoprene rubber, polybutadiene rubber, and styrene-butadiene rubber.

In certain embodiments of the first-third embodiments disclosed herein, a minority (by weight) of the at least one rubber comprises at least one of: styrene-isoprene rubber, butadiene-isoprene-rubber, styrene-isoprene-butadiene rubber, butyl rubber (both halogenated and non-halogenated), neoprene (polychloroprene), ethylene-propylene rubber, ethylene-propylene-diene rubber (EPDM), acrylonitrile-butadiene rubber (NBR), silicone rubber, fluorinated rubber, polyacrylate rubber (copolymer of acrylate monomer and vinyl ether), ethylene acrylic rubber, ethylene vinyl acetate copolymer (EVA), epichlorohydrin rubbers, chlorinated polyethylene rubbers, chlorosulfonated polyethylene rubbers, nitrile rubber, halogenated nitrile rubber, hydrogenated nitrile rubber, and tetrafluoroethylene-propylene rubber. In certain embodiments, up to 40% by weight (up to 40 parts or phr), up to 30% by weight (up to 30 parts or phr), up to 20% by weight (up to 20 parts or phr), up to 10% by weight (up to 10 parts or phr), up to 5% by weight (up to 5 parts or phr) of the rubber comprises at least one of: styrene-isoprene rubber, butadiene-isoprene-rubber, styrene-isoprene-butadiene rubber, butyl rubber (both halogenated and non-halogenated), neoprene (polychloroprene), ethylene-propylene rubber, ethylene-propylene-diene rubber (EPDM), acrylonitrile-butadiene rubber (NBR), silicone rubber, fluorinated rubber, polyacrylate rubber (copolymer of acrylate monomer and vinyl ether), ethylene acrylic rubber, ethylene vinyl acetate copolymer (EVA), epichlorohydrin rubbers, chlorinated polyethylene rubbers, chlorosulfonated polyethylene rubbers, nitrile rubber, halogenated nitrile rubber, hydrogenated nitrile rubber, and tetrafluoroethylene-propylene rubber. In other embodiments, 0% by weight (0 parts or phr) of the rubber comprises styrene-isoprene rubber, butadiene-isoprene-rubber, styrene-isoprene-butadiene rubber, butyl rubber (both halogenated and non-halogenated), neoprene (polychloroprene), ethylene-propylene rubber, ethylene-propylene-diene rubber (EPDM), acrylonitrile-butadiene rubber (NBR), silicone rubber, fluorinated rubber, polyacrylate rubber (copolymer of acrylate monomer and vinyl ether), ethylene acrylic rubber, ethylene vinyl acetate copolymer (EVA), epichlorohydrin rubbers, chlorinated polyethylene rubbers, chlorosulfonated polyethylene rubbers, nitrile rubber, halogenated nitrile rubber, hydrogenated nitrile rubber, and tetrafluoroethylene-propylene rubber; in such embodiments, 100 phr of the rubber comprises at least one of: natural rubber, synthetic polyisoprene rubber, polybutadiene rubber, and styrene-butadiene rubber. In yet other embodiments, up to 100% by weight (100 phr), including up to 90% by weight (90 phr), up to 80% by weight (80 phr), up to 70% by weight (70 phr) and up to 60% by weight (60 phr) of the rubber comprises at least one of: styrene-isoprene rubber, butadiene-isoprene-rubber, styrene-isoprene-butadiene rubber, butyl rubber (both halogenated and non-halogenated), neoprene (polychloroprene), ethylene-propylene rubber, ethylene-propylene-diene rubber (EPDM), acrylonitrile-butadiene rubber (NBR), silicone rubber, fluorinated rubber, polyacrylate rubber (copolymer of acrylate monomer and vinyl ether), ethylene acrylic rubber, ethylene vinyl acetate copolymer (EVA), epichlorohydrin rubbers, chlorinated polyethylene rubbers, chlorosulfonated polyethylene rubbers, nitrile rubber, halogenated nitrile rubber, hydrogenated nitrile rubber, and tetrafluoroethylene-propylene rubber.

In certain embodiments of the first-third embodiments disclosed herein, the at least one rubber comprises a polymer, a copolymer, or a combination thereof (i.e., more than one polymer, more than one copolymer, one polymer and one copolymer, more than one polymer and one copolymer, more than one copolymer and one polymer, or more than one copolymer and more than one polymer) when more than one rubber is utilized. In certain embodiments of the first-third embodiments disclosed herein, the at least one rubber includes at least one conjugated diene monomer-containing polymer or copolymer. Examples of suitable conjugated diene monomers according to certain embodiments of the first-third embodiments disclosed herein include, but are not limited to, 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, 1,3-cyclopentadiene, 1,3-cyclohexadiene, 1,3-cycloheptadiene, and 1,3-cyclooctadiene, and derivatives thereof. It should be understood that mixtures of two or more conjugated dienes may be utilized in certain embodiments. Non-limiting examples of suitable polymers that are conjugated diene monomer-containing polymers or copolymers include, but are not limited to, styrene-butadiene rubber, polybutadiene, polyisoprene, styrene-isoprene rubber, styrene-butadiene-isoprene rubber, and natural rubber. In certain embodiments of the first-third embodiments disclosed herein, the at least one rubber is at least one of: styrene-butadiene rubber, polybutadiene, synthetic polyisoprene rubber, and natural rubber.

As discussed above, in certain embodiments according to the first-third embodiments, the at least one rubber comprises polybutadiene. In certain embodiments according to the first-third embodiments, the polybutadiene comprises a high cis polybutadiene. In certain embodiments according to the first-third embodiments, the high cis polybutadiene has a cis 1,4-bond content of 85% of greater, 90% or greater, 92% or greater, or 95% or greater. In certain embodiments of the first-third embodiments, the polybutadiene has a cis 1,4-bond content of 85-99%, 90-99%, 90-98%, 90-97%, 92-99%, 92-98%, 92-97%, 95-99%, 95-98%, or 95-97%.

Generally, various polymerization methods are known for producing polybutadiene having a cis 1,4-bond content of 85% or greater, 90% or greater, 92% or greater, or 95% or greater and it should be understood that the particular method by which the polybutadiene is produced is not limited as long as the resulting polybutadiene has the specified cis 1,4-bond content. The percentages are based upon the number of diene mer units adopting the cis-1,4 linkage versus the total number of diene mer units. Polymerization of high-cis 1,4-polybutadiene is described in U.S. Pat. Nos. 3,297,667, 3,541,063, 3,794,604, 4,461,883, 4,444,903, 4,525,594, 4,699,960, 5,017,539, 5,428,119, 5,064,910, and 5,844,050, 7,094,849, all of which are hereby incorporated by reference. Exemplary polymerization methods include, but are not limited to, those employing Ziegler-Natta catalysts based on transition metals (e.g., lanthanides such as neodymium), nickel catalysts and titanium-based catalysts as well as solution, emulsion and bulk polymerization processes. Generally, the cis 1,4-, vinyl 1,2-, and trans 1,4-bond linkage contents in a given polymer such as polybutadiene can be determined by standard and well-established analytical methods such as infrared spectroscopy.

As discussed above, in certain embodiments according to the first-third embodiments, the at least one rubber comprises polyisoprene. In certain embodiments according to the first-third embodiments, the polyisoprene comprises high cis polyisoprene. In certain embodiments according to the first-third embodiments, the high cis polyisoprene has a cis 1,4-bond content of 90% of greater. In certain embodiments of the first-third embodiments, the polyisoprene has a cis 1,4-bond content of 90% or greater, 92% or greater, or 95% or greater. In certain embodiments of the first-third embodiments, the polyisoprene has a cis 1,4-bond content of 90-99%, 90-98%, 90-97%, 92-99%, 92-98%, 92-97%, 95-99%, 95-98%, or 95-97%.

Generally, various polymerization methods are known for producing polyisoprene, including polyisoprene having a cis 1,4-bond content of 90% or greater, and it should be understood that the particular method by which the polyisoprene is produced is not limited as long as the resulting polymer has the desired cis 1,4-bond content. As previously discussed with respect to polybutadiene, the percentages are based upon the number of diene mer units adopting the cis-1,4 linkage versus the total number of diene mer units. Polymerization of high-cis polyisoprene is described in U.S. Pat. Nos. 8,664,343; 8,188,201; 7,008,899; 6,897,270; and 6,699,813, all of which are hereby incorporated by reference. Exemplary polymerization methods include, but are not limited to, those employing Ziegler-Natta catalyst systems and those employing anionic polymerization with organometallic catalysts such as alkyl lithium in hydrocarbon solvents. As previously discussed with respect to polybutadiene, the cis-1,4-, cis-1,2-, and trans-1,4-linkage contents in a given polymer such as polyisoprene can be determined by standard and well-established analytical methods such as infrared spectroscopy.

As discussed above, in certain embodiments according to the first-third embodiments, the at least one rubber comprises the copolymer styrene-butadiene rubber (SBR). SBR is a copolymer of styrene and butadiene monomers. In certain embodiments according to the first-third embodiments disclosed herein, the SBR used in the rubber composition comprises about 10 to about 50% styrene monomer and about 50 to about 90% butadiene monomer by weight. In certain embodiments according to the first-third embodiments disclosed herein, the SBR used in the rubber composition comprises 10 to 50% styrene monomer and 50 to 90% butadiene monomer by weight. Generally, SBR is produced by solution or emulsion polymerization methods; however, it should be understood that the particular method by which the SBR is produced is not limited. The styrene and butadiene monomer content in a given SBR copolymer can be determined by standard and well-established analytical methods such as infrared spectroscopy.

Numerous commercial sources of the foregoing rubbers are well-known. As non-limiting examples, Firestone Polymers offers various grades of its Diene™ polybutadiene which have varying cis 1,4-bond contents (e.g., 40% and 96%) as well as various grades of its Duradene™ solution polymerized styrene-butadiene copolymer. Other commercial sources of the rubbers are well known, including sources for emulsion polymerized styrene-butadiene copolymer, functionalized versions of styrene-butadiene copolymer, neoprene, polybutadiene, synthetic polyisoprene rubber, and natural rubber.

In certain embodiments according to the first-third embodiments disclosed herein, the at least one rubber of the rubber composition comprises a functionalized polymer. In certain such embodiments, the rubber composition comprises about 5 to about 100 parts or phr of at least one functionalized polymer, including 5 to 100 parts or phr, about 10 to about 90 parts or phr, 10 to 90 parts or phr, about 10 to about 70 parts or phr, 10 to 70 parts or phr, about 10 to about 50 parts or phr, and 10 to 50 parts or phr. In certain embodiments according to the first-third embodiments disclosed herein, the functionalized polymer comprises a polymer with a silica-reactive functional group, a nitrogen-containing functional group, an oxygen-containing functional group, a sulfur-containing functional group, or a combination of the foregoing. Non-limiting examples of silica-reactive functional groups that are known to be utilized in functionalizing conjugated diene polymers and are suitable for use in the rubber compositions of certain embodiments of the first-third embodiments disclosed herein include nitrogen-containing functional groups, silicon-containing functional groups, oxygen or sulfur-containing functional groups, and metal-containing functional groups. As used herein, the term functionalized polymer should be understood to include polymers (including conjugated diene monomer-containing polymer or copolymer rubbers) with a functional group at one or both terminus (e.g., from use of a functionalized initiator, a functionalized terminator, or both), a functional group in the main chain of the polymer, and combinations thereof. For example, a silica-reactive functionalized polymer may have the functional group at one or both terminus, in the main chain thereof, or both in the main chain and at one or both terminus.

Non-limiting examples of nitrogen-containing functional groups that are known to be utilized in functionalizing rubbers include, but are not limited to, any of a substituted or unsubstituted amino group, an amide residue, an isocyanate group, an imidazolyl group, an indolyl group, a nitrile group, a pyridyl group, and a ketimine group. The foregoing substituted or unsubstituted amino group should be understood to include a primary alkylamine, a secondary alkylamine, or a cyclic amine, and an amino group derived from a substituted or unsubstituted imine. In certain embodiments according to the first-third embodiments disclosed herein, the rubber composition comprises a functionalized conjugated diene monomer-containing polymer or copolymer rubber having at least one functional group selected from the foregoing list.

Non-limiting examples of silicon-containing functional groups that are known to be utilized in functionalizing rubbers include, but are not limited to, an organic silyl or siloxy group, and more precisely, the functional group may be selected from an alkoxysilyl group, an alkylhalosilyl group, a siloxy group, an alkylaminosilyl group, and an alkoxyhalosilyl group. Suitable silicon-containing functional groups for use in functionalizing rubbers also include those disclosed in U.S. Pat. No. 6,369,167, the entire disclosure of which is hereby incorporated by reference. In certain embodiments according to the first-third embodiments disclosed herein, the rubber composition comprises a functionalized rubber having at least one functional group selected from the foregoing list.

Non-limiting examples of oxygen or sulfur-containing functional groups that are known to be utilized in functionalizing rubbers include, but are not limited to, a hydroxyl group, a carboxyl group, an epoxy group, a glycidoxy group, a diglycidylamino group, a cyclic dithiane-derived functional group, an ester group, an aldehyde group, an alkoxy group, a ketone group, a thiocarboxyl group, a thioepoxy group, a thioglycidoxy group, a thiodiglycidylamino group, a thioester group, a thioaldehyde group, a thioalkoxy group and a thioketone group. In certain embodiments, the foregoing alkoxy group may be an alcohol-derived alkoxy group derived from a benzophenone. In certain embodiments according to the first-third embodiments disclosed herein, the rubber composition comprises a functionalized conjugated diene monomer-containing polymer or copolymer rubber having at least one functional group selected from the foregoing list.

Generally, rubbers, including conjugated diene monomer-containing polymer or copolymer rubbers, may be prepared and recovered according to various suitable methods such as batch, semi-continuous, or continuous operations, as are well known to those having skill in the art. The polymerization can also be carried out in a number of different polymerization reactor systems, including but not limited to bulk polymerization, vapor phase polymerization, solution polymerization, suspension polymerization, coordination polymerization, and emulsion polymerization. The polymerization may be carried out using a free radical mechanism, an anionic mechanism, a cationic mechanism, or a coordination mechanism. All of the above polymerization methods are well known to persons skilled in the art. However, for exemplary purposes, a short description of polymerization via an anionic mechanism is given.

When rubbers, such as conjugated diene monomer-containing polymer or copolymer rubbers, are produced through anionic polymerization, an organic alkaline metal compound, preferably a lithium-containing compound, is typically used as a polymerization initiator. Examples of lithium-containing compounds used as polymerization initiators include, but are not limited to, hydrocarbyl lithium compounds, lithium amide compounds, and similar lithium compounds. The amount of the lithium compound used as the polymerization initiator is preferably within a range of 0.2 to 20 millimoles per 100 g of the monomer.

Non-limiting examples of hydrocarbyl lithium compounds include ethyl lithium, n-propyl lithium, isopropyl lithium, n-butyl lithium, sec-butyl lithium, tert-octyl lithium, n-decyl lithium, phenyl lithium, 2-naphthyl lithium, 2-butylphenyl lithium, 4-phenyl-butyl lithium, cyclohexyl lithium, cyclopentyl lithium, a reaction product of diisopropylenbenzene and butyl lithium, and mixtures thereof. Among these, alkyl lithium compounds such as ethyl lithium, n-propyl lithium, isopropyl lithium, n-butyl lithium, sec-butyl lithium, tert-octyl lithium, n-decyl lithium and so on are preferable, and n-butyl lithium is particularly preferable.

Methods for producing rubbers, such as conjugated diene-monomer-containing polymer or copolymer rubbers, through anionic polymerization using an organic alkaline metal compound as the polymerization initiator are not particularly limited. For example, a conjugated diene monomer-containing polymer or copolymer rubber can be produced by polymerizing a conjugated diene monomer alone or a mixture of a conjugated diene monomer and aromatic vinyl compound in a hydrocarbon solvent inactive to the polymerization reaction. Non-limiting examples of the hydrocarbon solvent inactive to the polymerization reaction include propane, n-butane, isobutane, n-pentane, isopentane, n-hexane, cyclohexane, propene, 1-butene, isobutene, trans-2-butene, cis-2-butene, 1-pentene, 2-pentene, 1-hexene, 2-hexene, benzene, toluene, xylene, ethylbenzene and mixtures thereof.

The anionic polymerization may be carried out in the presence of a randomizer. The randomizer can control the microstructure of the conjugated diene compound, and has an action that the 1,2-bond content in butadiene unit of the polymer using, for example, butadiene as a monomer is controlled, and butadiene unit and styrene unit in the copolymer using butadiene and styrene as a monomer are randomized, or the like. Non-limiting examples of the randomizer include dimethoxybenzene, tetrahydrofuran, dimethoxyethane, diethylene glycol dibutyl ether, diethylene glycol dimethyl ether, bis tetrahydrofuryl propane, triethylamine, pyridine, N-methylmorpholine, N,N,N',N'-tetramethyl ethylenediamine, 1,2-dipiperidinoethane, potassium-t-amylate, potassium-t-butoxide, sodium-t-amylate and so on. The amount of the randomizer used is preferably within a range of 0.01 to 100 molar equivalents per 1 mol of the organic alkaline metal compound as a polymerization initiator.

The anionic polymerization may be carried out through any of solution polymerization, vapor phase polymerization and bulk polymerization. In the solution polymerization, the concentration of the monomer in the solution is preferably within a range of 5 to 50% by mass, more preferably 10 to 30% by mass. When the conjugated diene monomer and a vinyl aromatic monomer are used together, the content of the vinyl aromatic monomer in the mixture is preferably within a range of 3 to 50% by mass, more preferably 4 to 45% by mass. Also, the polymerization system is not particularly limited and may be a batch system or a continuous system.

The polymerization temperature in the anionic polymerization is preferably within a range of 0 to 150° C., more preferably 20 to 130° C. The polymerization may be carried out under a generating pressure or, preferably, at a pressure sufficient to keep the reaction monomers substantially in a liquid phase. When the polymerization reaction is carried out under a pressure higher than the generating pressure, the reaction system is preferably pressurized with an inert gas. Preferably, any reaction-obstructing substances, such as water, oxygen, carbon dioxide, protonic compounds, and the like are removed before beginning the polymerization reaction.

Typically, in the rubber compositions according to the first-third embodiments disclosed herein, the overall composition contains 100 parts or phr (in total) of at least one rubber. In other words, the total amount of all rubbers is considered to be 100 parts (by weight) and can also be denoted 100 phr. Other components are added based upon 100 parts (in total) of rubber(s). As a non-limiting example, 60 parts of styrene-butadiene copolymer could be utilized along with 40 parts of polybutadiene polymer and 60 parts of silica; these amounts could be described herein as 60 phr of styrene-butadiene copolymer, 40 phr of polybutadiene polymer and 60 phr of silica.

Reinforcing Silica Filler

As discussed above, according to the first-third embodiments disclosed herein, the rubber composition comprises about 5 to about 200 phr of reinforcing silica filler. One or more than one reinforcing silica filler may be utilized in the rubber compositions according to the first-third embodiments disclosed herein. In certain embodiments of the first-third embodiments disclosed herein, the total amount of the filler is 5 to 200 phr, including about 10 to about 200 phr, 10 to 200 phr, about 10 to about 175 phr, 10 to 175 phr, about 25 to about 150 phr, 25 to 150 phr, about 35 to about 150 phr, 35 to 150 phr, about 25 to about 125 phr, 25 to 125 phr, about 25 to about 100 phr, 25 to 100 phr, about 25 to about 80 phr, 25 to 80 phr, about 35 to about 125 phr, 35 to 125 phr, about 35 to about 100 phr, 35 to 100 phr, about 35 to about 80 phr, and 35 to 80 phr of at least one filler. In certain embodiments, the useful upper range for the amount of reinforcing silica filler can be considered to be somewhat limited by the high viscosity imparted by fillers of this type.

As used herein, the term "reinforcing" with respect to "reinforcing carbon black filler," "reinforcing silica filler," and "reinforcing fillers" generally should be understood to encompass both fillers that are traditionally described as reinforcing as well as fillers that may be described as semi-reinforcing. Traditionally, the term "reinforcing filler" is used to refer to a particulate material that has a nitrogen absorption specific surface area ($N_2SA$) of more than about 100 $m^2/g$, and in certain instances more than 100 $m^2/g$, more than about 125 $m^2/g$, more than 125 $m^2/g$, or even more than about 150 $m^2/g$ or more than 150 $m^2/g$. Alternatively, the traditional use of the term "reinforcing filler" can also be used to refer to a particulate material that has a particle size of about 10 nm to about 50 nm (including 10 nm to 50 nm). Traditionally, the term "semi-reinforcing filler" is used to refer to a filler that is intermediary in either particle size, surface area ($N_2SA$), or both, to a non-reinforcing filler and a reinforcing filler. In certain embodiments of the first-third embodiments disclosed herein, the term "reinforcing filler" is used to refer to a particulate material that has a nitrogen absorption specific surface area ($N_2SA$) of about 20 $m^2/g$ or greater, including 20 $m^2/g$ or greater, more than about 50 $m^2/g$, more than 50 $m^2/g$, more than about 100 $m^2/g$, more than 100 $m^2/g$, more than about 125 $m^2/g$, and more than 125 $m^2/g$. In certain embodiments of the first-third embodiments disclosed herein, the term "reinforcing filler" is used to refer to a particulate material that has a particle size of about 10 nm up to about 1000 nm, including 10 nm to 1000 nm, about 10 nm up to about 50 nm and 10 nm to 50 nm.

Suitable reinforcing silica fillers for use in the rubber composition disclosed herein are well known. Non-limiting examples of reinforcing silica fillers suitable for use in the rubber compositions of certain embodiments of the first-third embodiments disclosed herein include, but are not limited to, precipitated amorphous silica, wet silica (hydrated silicic acid), dry silica (anhydrous silicic acid), fumed silica, calcium silicate and the like. Other suitable reinforcing silica fillers for use in rubber compositions of certain embodiments of the first-third embodiments disclosed herein include, but are not limited to, aluminum silicate, magnesium silicate ($Mg_2SiO_4$, $MgSiO_3$ etc.), magnesium calcium silicate ($CaMgSiO_4$), calcium silicate ($Ca_2SiO_4$ etc.), aluminum silicate ($Al_2SiO_5$, $Al_4.3SiO_4.5H_2O$ etc.), aluminum calcium silicate ($Al_2O_3.CaO_2SiO_2$, etc.), and the like. Among the listed reinforcing silica fillers, precipitated amorphous wet-process, hydrated silica fillers are preferred. Such reinforcing silica fillers are produced by a chemical reaction in water, from which they are precipitated as ultrafine, spherical particles, with primary particles strongly associated into aggregates, which in turn combine less strongly into agglomerates. The surface area, as measured by the BET method, is a preferred measurement for characterizing the reinforcing character of different reinforcing silica fillers. In certain embodiments of the first-third embodiments disclosed herein, the rubber composition comprises a reinforcing silica filler having a surface area (as measured by the BET method) of about 32 $m^2/g$ to about 400 $m^2/g$ (including 32 $m^2/g$ to 400 $m^2/g$), with the range of about 100 $m^2/g$ to about 300 $m^2/g$ (including 100 $m^2/g$ to 300 $m^2/g$) being preferred, and the range of about 150 $m^2/g$ to about 220 $m^2/g$ (including 150 $m^2/g$ to 220 $m^2/g$) being included. In certain embodiments of the first-third embodiments disclosed herein, the rubber composition comprises reinforcing silica filler having a pH of about 5.5 to about 7 or slightly over 7, preferably about 5.5 to about 6.8. Some of the commercially available reinforcing silica fillers which can be used in the rubber compositions of certain embodiments of the first-third embodiments disclosed herein include, but are not limited to, Hi-Sil®190, Hi-Sil®210, Hi-Sil®215, Hi-Sil®233, Hi-Sil®243, and the like, produced by PPG Industries (Pittsburgh, Pa.). As well, a number of useful commercial grades of different reinforcing silica fillers are also available from Degussa Corporation (e.g., VN2, VN3), Rhone Poulenc (e.g., Zeosil™ 1165MP), and J. M. Huber Corporation.

In certain embodiments of the first-third embodiments disclosed herein, as discussed in more detail below, the reinforcing silica filler comprises a silica that has been pre-treated with a silica coupling agent; preferably the pre-treated silica comprises a silica that has been pre-treated with a silane-containing silica coupling agent.

Other Fillers

In certain embodiments of the first-third embodiments disclosed herein, the rubber composition further comprises one or more carbon blacks, which is commonly understood to be a reinforcing filler. In other words, carbon black is not considered to be an essential component of the rubber compositions in all embodiments of the first-third embodiments disclosed herein. In those embodiments of the first-third embodiments, where the rubber composition includes one or more carbon blacks, the total amount of carbon black and reinforcing filler is about 10 to about 200 phr. In certain embodiments of the first-third embodiments disclosed herein, the rubber composition comprises carbon black in an amount of from zero to about 50% by weight of the total reinforcing filler, including zero to 50%, about 5% to about 30%, 5% to 30%, from about 5% to about 20%, 5% to 20%, about 10% to about 30%, 10% to 30%, about 10% to about 20%, and 10% to 20% by weight of the total reinforcing filler. In certain embodiments of the first-third embodiments disclosed herein, the carbon black comprises no more than about 30% by weight (including no more than 30% by weight) of the total reinforcing filler in the rubber composition. In certain embodiments of the first-third embodiments disclosed herein, the rubber composition comprises about 5 to about 100 phr (including 5 to 100 phr) of one or more carbon blacks. Generally, suitable carbon black for use in the rubber composition of certain embodiments of the first-third embodiments disclosed herein includes any of the commonly available, commercially-produced carbon blacks, including those having a surface area of at least about 20 $m^2/g$ (including at least 20 $m^2/g$) and, more preferably, at least about 35 $m^2/g$ up to about 200 $m^2/g$ or higher (including 35 $m^2/g$ up to 200 $m^2/g$). Surface area values used in this application are determined by ASTM D-1765 using the cetyltrimethyl-ammonium bromide (CTAB) technique. Among the useful carbon blacks are furnace black, channel blacks, and lamp blacks. More specifically, examples of useful carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which can be utilized include acetylene blacks. In certain embodiments of the first-third embodiments disclosed herein, the rubber composition includes a mixture of two or more of the foregoing blacks. Typical suitable carbon blacks for use in certain embodiments of the first-third embodiments disclosed herein are N-110, N-220, N-339, N-330, N-351, N-550, and N-660, as designated by ASTM D-1765-82a. The carbon blacks utilized can be in pelletized form or an unpelletized flocculent mass. Preferably, for more uniform mixing, unpelletized carbon black is preferred.

In certain embodiments of the first-third embodiments, the rubber composition comprises at least one additional reinforcing filler in addition to the reinforcing silica filler and the optional carbon black. Non-limiting examples of suitable additional reinforcing fillers for use in the rubber compositions of certain embodiments of the first-third embodiments disclosed herein include, but are not limited to, alumina, aluminum hydroxide, clay, magnesium hydroxide, boron nitride, aluminum nitride, titanium dioxide, reinforcing zinc oxide, and combinations thereof. Suitable inorganic fillers for use in the rubber compositions according to the first-third embodiments are not particularly limited and non-limiting examples include: silica, aluminum hydroxide, talc, clay, alumina ($Al_2O_3$), aluminum hydrate ($Al_2O_3H_2O$), aluminum hydroxide ($Al(OH)_3$), aluminum carbonate ($Al_2(CO_3)_2$), aluminum nitride, aluminum magnesium oxide ($MgOAl_2O_3$), pyrofilite ($Al_2O_34SiO_2.H_2O$), bentonite ($Al_2O_3.4SiO_2.2H_2O$), boron nitride, mica, kaolin, glass balloon, glass beads, calcium oxide (CaO), calcium hydroxide ($Ca(OH)_2$), calcium carbonate ($CaCO_3$), magnesium carbonate, magnesium hydroxide ($MH(OH)_2$), magnesium oxide (MgO), magnesium carbonate ($MgCO_3$), titanium oxide, titanium dioxide, potassium titanate, barium sulfate, zirconium oxide ($ZrO_2$), zirconium hydroxide [$Zr(OH)_2.nH_2O$], zirconium carbonate [$Zr(CO_3)_2$], crystalline aluminosilicates, reinforcing grades of zinc oxide (i.e., reinforcing zinc oxide), and combinations thereof.

In certain embodiments of the first-third embodiments, the rubber composition further comprises at least one non-reinforcing filler. In certain embodiments, the term "non-reinforcing filler" is used to refer to a particulate material that has a nitrogen absorption specific surface area ($N_2SA$) of less than about 20 $m^2/g$ (including less than 20 $m^2/g$), and in certain embodiments less than about 10 $m^2/g$ (including less than 10 $m^2/g$). The $N_2SA$ surface area of a particulate material can be determined according to various standard methods including ASTM D6556. In certain embodiments of the compositions and methods disclosed herein, the term "non-reinforcing filler" is used to refer to a particulate material that has a particle size of greater than about 1000 nm (including greater than 1000 nm). In certain embodiments of the first-third embodiments disclosed herein, the rubber composition further comprises at least one of the following non-reinforcing fillers: clay, graphite, titanium dioxide, magnesium dioxide, aluminum oxide, starch, boron nitride, silicon nitride, aluminum nitride, calcium silicate, and silicon carbide.

In certain embodiments of the first-third embodiments disclosed herein, the rubber composition comprises at least one reinforcing silica filler, at least one reinforcing carbon black filler, and at least one non-reinforcing filler, with the total amount of all reinforcing fillers being about 5 to about 200 phr (including 5 to 200 phr). In certain embodiments of the first-third embodiments disclosed herein, the rubber composition comprises at least one reinforcing silica filler, at least one reinforcing carbon black filler, at least one additional reinforcing filler, and at least one non-reinforcing filler, with the total amount of all reinforcing fillers being about 5 to about 200 phr (including 5 to 200 phr). In certain embodiments of the first-third embodiments disclosed herein, the rubber composition comprises at least one reinforcing silica filler, at least one reinforcing carbon black filler, and at least one non-reinforcing filler, with the total amount of all reinforcing fillers being about 5 to about 200 phr (including 5 to 200 phr). In certain embodiments of the first-third embodiments disclosed herein, the rubber composition comprises at least one reinforcing silica filler in an amount of about 5 to about 200 phr (including 5 to 200 phr), and at least one non-reinforcing filler. In certain embodiments of the first-third embodiments disclosed herein, the rubber composition comprises at least one reinforcing silica filler in an amount of about 5 to about 200 phr (including 5 to 200 phr), and at least one reinforcing filler other than carbon black or silica. In certain embodiments of the first-third embodiments disclosed herein, the rubber composition comprises at least one reinforcing silica filler, and at least one reinforcing filler other than carbon black or silica, and at least one non-reinforcing filler, with the total amount of all reinforcing fillers being about 5 to about 200 phr (including 5 to 200 phr).

In certain embodiments of the first-third embodiments disclosed herein, the rubber composition further comprises cellulose ester. Cellulose ester is a compound based upon cellulose (cellulose is a polysaccharide having the formula $C_6H_{10}O_5$ and consists of a linear chain of hundreds to thousands of 1,4-linked D-glucose units). Cellulose esters are produced by converting (esterifying) —OH groups in cellulose to an ester. The hydrocarbon groups used to esterify cellulose can vary widely; in certain embodiments, the R portion of the alkanoyl group (i.e., —C(=O)R) used to esterify comprises an alkyl group having 1-10 carbons; in certain embodiments more than one type of ester group is used to esterify, thereby producing a cellulose ester with more than one type of alkanoyl group. In certain embodiments of the first-third embodiments, the rubber composition comprises at least one cellulose ester selected from cellulose acetate, cellulose acetate propionate, cellulose acetate butyrate, cellulose acetate triacetate, cellulose tripropionate, or cellulose tributyrate. According to the first-third embodiments disclosed herein, the rubber composition can comprise one or more than one cellulose ester. The cellulose ester that is utilized in the rubber compositions of certain embodiments of the first-third embodiments generally comprises a cellulose ester. Various commercially available cellulose esters exist, including those in powder, pellet, or fiber form. Exemplary cellulose esters suitable for use in the rubber compositions of the first-third embodiments disclosed herein include those available from Eastman Chemical Company (Kingsport, Tenn.) such as cellulose acetate, cellulose acetate butyrate, and cellulose acetate propionate. In certain embodiments of the first-third embodiments disclosed herein, the cellulose ester comprises cellulose acetate. In certain embodiments of the first-third embodiments disclosed herein, the cellulose ester comprises cellulose acetate butyrate. In certain embodiments of the embodiments of the first-third embodiments disclosed herein, the cellulose ester comprises cellulose acetate propionate. In certain embodiments of the first-third embodiments disclosed herein, the cellulose ester comprises cellulose acetate, cellulose acetate butyrate, cellulose acetate propionate, or a combination thereof. Cellulose esters can be classified by various properties including the percentage of acetylation (the converse of which is the percentage of —OH groups remaining), melting range, Tg, and Mn. In certain embodiments of the first-third embodiments, the cellulose ester comprises cellulose acetate having at least one of the following properties: 3-4% —OH groups, melting range of 230-250° C., Tg of 180-190° C., or Mn of 30,000-50,000 grams/mole (number average molecular weight in polystyrene equivalents determined using size exclusion chromatography). In certain embodiments of the first-third embodiments, the cellulose ester comprises cellulose acetate butyrate having at least one of the following properties: 1-5% —OH groups, melting range of 120-250° C., Tg of 80-170° C., or Mn of 10,000 to 75,000. In certain embodiments of the first-third embodiments, the cellulose ester comprises cellulose acetate propionate having at least one of the following properties: 1.5-5% —OH groups, melting range of 180-210° C., Tg of 140-160° C., and Mn of 15,000-75,000. In certain embodiments of the first-third embodiments disclosed herein, the rubber composition comprises cellulose ester in an amount of about 1 to about 100 phr (e.g., 1 phr, 5 phr, 10 phr, 15 phr, 20 phr, 25 phr, 30 phr, 35 phr, 40 phr, 45 phr, 50 phr, 55 phr, 60 phr, 65 phr, 70 phr, 75 phr, 80 phr, 85 phr, 90 phr, 95 phr, 100 phr), including 1 to 100 phr, about 1 to about 75 phr, 1 to 75 phr, about 5 to about 75 phr, 5 to 75 phr, about 1 to about 30 phr, 1 to 30 phr, about 5 to about 30 phr, and 5 to 30 phr phr. In certain embodiments of the first-third embodiments disclosed herein, the rubber composition comprises cellulose ester in one of the foregoing amounts and the total amount of silica filler and cellulose ester comprises about 5 to about 200 phr, including 5 to 200 phr. In certain embodiments of the first-third embodiments disclosed herein, the rubber composition comprises cellulose ester in one of the foregoing amounts, as well as carbon black filler, and the total amount of silica filler, carbon black filler and cellulose ester comprises about 5 to about 200 phr. In certain embodiments of the first-third embodiments disclosed herein, the rubber composition comprises cellulose ester in one of the foregoing amounts, silica filler, optionally carbon black filler, and at least one additional reinforcing or non-reinforcing filler. Rubber compositions according to the first-third embodiments disclosed herein which include cellulose ester can be prepared according to various processes as discussed herein; generally according to such processes the whey protein and the cellulose ester will both be added during a masterbatch stage. In certain embodiments, a rubber composition according to the first-third embodiments disclosed herein which includes cellulose ester is prepared by adding the whey protein and the cellulose ester during the same masterbatch stage; in certain such embodiments, the whey protein and the cellulose ester are added during a second masterbatch stage and in other embodiments, the whey protein and the cellulose ester are added during a first masterbatch stage. In other embodiments, a rubber composition according to the first-third embodiments disclosed herein which includes cellulose ester is prepared by adding the whey protein and the cellulose ester during different masterbatch stages; in certain such embodiments, the whey protein is added before the cellulose ester (e.g., whey protein during a first masterbatch stage and cellulose ester during a second masterbatch stage) and in other embodiments, the whey protein is added after the cellulose ester (e.g., cellulose ester during a first masterbatch stage and whey protein during a second masterbatch stage). Alternatively, in certain embodiments of the first-third embodiments which includes cellulose ester, at least one of the whey protein and cellulose ester is added during more than one masterbatch stage.

In certain embodiments of the first-third embodiments disclosed herein, the rubber composition further comprises starch. Starch is a polysaccharide compound containing amylose (generally 20-25%) and amylopectin (generally 75-80%) with the relative amounts varying somewhat depending upon the source of the starch. Starch is generally sourced from plants with various types of plants (e.g., corn, potato, cassava, wheat, barley, rice, maize, sweet potato) providing relatively inexpensive sources of starch. Generally, the starch will be in solid form although the particular form may vary with non-limiting examples including powders, fibers, and pellets. In certain embodiments of the first-third embodiments disclosed herein, the rubber composition comprises at least one starch selected from at least one of: corn starch, potato starch, cassava starch, wheat starch, barley starch, rice starch, maize starch, or sweet potato starch. In certain embodiments of the first-third embodiments disclosed herein, the rubber composition comprises starch in an amount of about 1 to about 100 phr (e.g., 1 phr, 5 phr, 10 phr, 15 phr, 20 phr, 25 phr, 30 phr, 35 phr, 40 phr, 45 phr, 50 phr, 55 phr, 60 phr, 65 phr, 70 phr, 75 phr, 80 phr, 85 phr, 90 phr, 95 phr, 100 phr), including 1 to 100 phr, about 1 to about 75 phr, 1 to 75 phr, about 5 to about 75 phr, 5 to 75 phr, about 5 to about 30 phr, or 5 to 30 phr. In certain embodiments of the first-third embodiments disclosed herein, the rubber composition comprises starch in one of the foregoing amounts and the total amount of silica filler and starch comprises about 5 to about 200 phr, including 5 to 200 phr. In certain embodiments of the first-third embodiments disclosed herein, the rubber composition comprises starch in one of the foregoing amounts, as well as carbon black filler, and the total amount of silica filler, carbon black filler and starch comprises about 5 to about 200 phr. In certain embodiments of the first-third embodiments disclosed herein, the rubber composition comprises starch in one of the foregoing amounts, silica filler, optionally carbon black filler, and at least one additional reinforcing or non-reinforcing filler. Rubber compositions according to the first-third embodiments disclosed herein which include starch can be prepared according to various processes as discussed herein; generally according to such processes the whey protein and the starch will both be added during a masterbatch stage. In certain embodiments, a rubber composition according to the first-third embodiments disclosed herein which includes starch is prepared by adding the whey protein and the starch during the same masterbatch stage; in certain such embodiments, the whey protein and the starch are added during a second masterbatch stage and in other embodiments, the whey protein and the starch are added during a first masterbatch stage. In other embodiments, a rubber composition according to the first-third embodiments disclosed herein which includes starch is prepared by adding the whey protein and the starch during different masterbatch stages; in certain such embodiments, the whey protein is added before the starch (e.g., whey protein during a first masterbatch stage and starch during a second masterbatch stage) and in other embodiments, the whey protein is added after the starch (e.g., starch during a first masterbatch stage and whey protein during a second masterbatch stage). Alternatively, in certain embodiments of the first-third embodiments which includes starch, at least one of the whey protein and starch is added during more than one masterbatch stage.

Silica Coupling Agents

As discussed above, in certain embodiments of the first-third embodiments disclosed herein, the rubber composition includes one or more silica coupling agents. Silica coupling agents are useful in preventing or reducing aggregation of the silica filler in the rubber composition. Aggregates of the silica filler particles are believed to increase the viscosity of the rubber composition, and, therefore, preventing this aggregation reduces the viscosity and improves the processibility and blending of the rubber composition.

Generally, any conventional type of silica coupling agent can be used, such as those having a silane and a constituent component or moiety that can react with a polymer, particularly a vulcanizable polymer. The silica coupling agent acts as a connecting bridge between silica and the polymer. Suitable silica coupling agents include those containing groups such as alkyl alkoxy, mercapto, blocked mercapto, sulfide-containing (e.g., monosulfide-based alkoxy-containing, disulfide-based alkoxy-containing, tetrasulfide-based alkoxy-containing), amino, vinyl, epoxy, and combinations thereof. In certain embodiments, the silica coupling agent can be added to the rubber composition in the form of a pre-treated silica; a pre-treacted silica has been pre-surface treated with a silane prior to being added to the rubber composition. The use of a pre-treated silica can allow for two ingredients (i.e., silica and a silica coupling agent) to be added in one ingredient, which generally tends to make rubber compounding easier.

Alkyl alkoxysilanes have the general formula $R^1_p Si(OR^2)_{4-p}$ where each $R^2$ is independently a monovalent organic group, and p is an integer from 1 to 3, with the proviso that at least one $R^1$ is an alkyl group. Preferably p is 1. Generally, each $R^1$ independently comprises $C_1$ to $C_{20}$ aliphatic, $C_5$ to $C_{20}$ cycloaliphatic, or $C_6$ to $C_{20}$ aromatic; and each $R^2$ independently comprises $C_1$ to $C_6$ aliphatic. In certain exemplary embodiments, each $R^1$ independently comprises $C_6$ to $C_{15}$ aliphatic and in additional embodiments each $R^1$ independently comprises $C_8$ to $C_{14}$ aliphatic. Mercapto silanes have the general formula $HS—R^3—Si(R^4)(R^5)_2$ where $R^3$ is a divalent organic group, $R^4$ is a halogen atom or an alkoxy group, each $R^5$ is independently a halogen, an alkoxy group or a monovalent organic group. The halogen is chlorine, bromine, fluorine, or iodine. The alkoxy group preferably has 1-3 carbon atoms. Blocked mercapto silanes have the general formula $B—S—R^6—Si—X_3$ with an available silyl group for reaction with silica in a silica-silane reaction and a blocking group B that replaces the mercapto hydrogen atom to block the reaction of the sulfur atom with the polymer. In the foregoing general formula, B is a block group which can be in the form of an unsaturated heteroatom or carbon bound directly to sulfur via a single bond; $R^6$ is $C_1$ to $C_6$ linear or branched alkylidene and each X is independently selected from the group consisting of $C_1$ to $C_4$ alkyl or $C_1$ to $C_4$ alkoxy.

Non-limiting examples of alkyl alkoxysilanes suitable for use in the rubber compositions of certain exemplary embodiments according to the first-third embodiments disclosed herein include, but are not limited to, octyltriethoxysilane, octyltrimethoxysilane, trimethylethoxysilane, cyclohexyltriethoxysilane, isobutyltriethoxy-silane, ethyltrimethoxysilane, cyclohexyl-tributoxysilane, dimethyldiethoxysilane, methyltriethoxysilane, propyltriethoxysilane, hexyltriethoxysilane, heptyltriethoxysilane, nonyltriethoxysilane, decyltriethoxysilane, dodecyltriethoxysilane, tetradecyltriethoxysilane, octadecyltriethoxysilane, methyloctyldiethoxysilane, dimethyldimethoxysilane, methyltrimethoxysilane, propyltrimethoxysilane, hexyltrimethoxysilane, heptyltrimethoxysilane, nonyltrimethoxysilane, decyltrimethoxysilane, dodecyltrimethoxysilane, tetradecyltrimethoxysilane, octadecyl-trimethoxysilane, methyloctyl dimethoxysilane, and mixtures thereof.

Non-limiting examples of bis(trialkoxysilylorgano)polysulfides suitable for use in the rubber compositions of certain exemplary embodiments according to the first-third embodiments disclosed herein include bis(trialkoxysilylorgano) disulfides and bis(trialkoxysilylorgano)tetrasulfides. Specific non-limiting examples of bis(trialkoxysilylorgano)disulfides suitable for use in the rubber compositions of certain exemplary embodiments according to the first-third embodiments disclosed herein include, but are not limited to, 3,3'-bis(triethoxysilylpropyl) disulfide, 3,3'-bis(trimethoxysilylpropyl)disulfide, 3,3'-bis(tributoxysilylpropyl)disulfide, 3,3'-bis(tri-t-butoxysilylpropyl)disulfide, 3,3'-bis(trihexoxysilylpropyl)disulfide, 2,2'-bis(dimethylmethoxysilylethyl)disulfide, 3,3'-bis(diphenylcyclohexoxysilylpropyl)disulfide, 3,3'-bis(ethyl-di-sec-butoxysilylpropyl)disulfide, 3,3'-bis(propyldiethoxysilylpropyl)disulfide, 12,12'-bis(triisopropoxysilylpropyl)disulfide, 3,3'-bis(dimethoxyphenylsilyl-2-methylpropyl)disulfide, and mixtures thereof. Non-limiting examples of bis(trialkoxysilylorgano)tetrasulfide silica coupling agents suitable for use in the rubber compositions of certain exemplary embodiments according to the first-third embodiments disclosed herein include, but are not limited to, bis(3-triethoxysilylpropyl)tetrasulfide, bis(2-triethoxysilylethyl) tetrasulfide, bis(3-trimethoxysilylpropyl) tetrasulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilyl-N,N-dimethylthiocarbamoyl tetrasulfide, 3-trimethoxysilylpropyl-benzothiazole tetrasulfide, 3-triethoxysilylpropyl-benzothiazole tetrasulfide, and mixtures thereof. Bis(3-triethoxysilylpropyl)tetrasulfide is sold commercially as Si69® by Evonik Degussa Corporation.

Non-limiting examples of mercapto silanes suitable for use in the rubber compositions of certain exemplary embodiments of the first-third embodiments disclosed herein include, but are not limited to, 1-mercaptomethyltriethoxysilane, 2-mercaptoethyltriethoxysilane, 3-mercaptopropyltriethoxysilane, 3-mercaptopropylmethyldiethoxysilane, 2-mercaptoethyltripropoxysilane, 18-mercaptooctadecyldiethoxychlorosilane, and mixtures thereof.

Non-limiting examples of blocked mercapto silanes suitable for use in the rubber compositions of certain exemplary embodiments according to the first-third embodiments disclosed herein include, but are not limited to, those described in U.S. Pat. Nos. 6,127,468; 6,204,339; 6,528,673; 6,635,700; 6,649,684; and 6,683,135, the disclosures of which are hereby incorporated by reference. Representative examples of the blocked mercapto silanes for use herein in certain exemplary embodiments disclosed herein include, but are not limited to, 2-triethoxysilyl-1-ethylthioacetate; 2-trimethoxysilyl-1-ethylthioacetate; 2-(methyldimethoxysilyl)-1-ethylthioacetate; 3-trimethoxysilyl-1-propylthioacetate; triethoxysilylmethyl-thioacetate; trimethoxysilylmethylthioacetate; triisopropoxysilylmethylthioacetate; methyldiethoxysilylmethylthioacetate; methyldimethoxysilylmethylthioacetate; methyldiisopropoxysilylmethylthioacetate; dimethylethoxysilylmethylthioacetate; dimethylmethoxysilylmethylthioacetate; dimethylisopropoxysilylmethylthioacetate; 2-triisopropoxysilyl-1-ethylthioacetate; 2-(methyldiethoxysilyl)-1-ethylthioacetate; 2-(methyldiisopropoxysilyl)-1-ethylthioacetate; 2-(dimethylethoxysilyl-1-ethylthioacetate; 2-(dimethylmethoxysilyl)-1-ethylthioacetate; 2-(dimethylisopropoxysilyl)-1-ethylthioacetate; 3-triethoxysilyl-1-propylthioacetate; 3-triisopropoxysilyl-1-propylthioacetate; 3-methyldiethoxysilyl-1-propyl-thioacetate; 3-methyldimethoxysilyl-1-propylthioacetate; 3-methyldiisopropoxysilyl-1-propylthioacetate; 1-(2-triethoxysilyl-1-ethyl)-4-thioacetylcyclohexane; 1-(2-triethoxysilyl-1-ethyl)-3-thioacetylcyclohexane; 2-triethoxysilyl-5-thioacetylnorbornene; 2-triethoxysilyl-4-thioacetylnorbornene; 2-(2-triethoxysilyl-1-ethyl)-5-thioacetylnorbornene; 2-(2-triethoxy-silyl-1-ethyl)-4-thioacetylnorbornene; 1-(1-oxo-2-thia-5-triethoxysilylphenyl)benzoic acid; 6-triethoxysilyl-1-hexylthioacetate; 1-triethoxysilyl-5-hexylthioacetate; 8-triethoxysilyl-1-octylthioacetate; 1-triethoxysilyl-7-octylthioacetate; 6-triethoxysilyl-1-hexylthioacetate; 1-triethoxysilyl-5-octylthioacetate; 8-trimethoxysilyl-1-octylthioacetate; 1-trimethoxysilyl-7-octylthioacetate; 10-triethoxysilyl-1-decylthioacetate; 1-triethoxysilyl-9-decylthioacetate; 1-triethoxysilyl-2-butylthioacetate; 1-triethoxysilyl-3-butylthioacetate; 1-triethoxysilyl-3-methyl-2-butylthioacetate; 1-triethoxysilyl-3-methyl-3-butylthioacetate; 3-trimethoxysilyl-1-propylthiooctanoate; 3-triethoxysilyl-1-propyl-1-propylthiopalmitate; 3-triethoxysilyl-1-propylthiooctanoate; 3-triethoxysilyl-1-propylthiobenzoate; 3-triethoxysilyl-1-propylthio-2-ethylhexanoate; 3-methyldiacetoxysilyl-1-propylthioacetate; 3-triacetoxysilyl-1-propylthioacetate; 2-methyldiacetoxysilyl-1-ethylthioacetate; 2-triacetoxysilyl-1-ethylthioacetate; 1-methyldiacetoxysilyl-1-ethylthioacetate; 1-triacetoxysilyl-1-ethyl-thioacetate; tris-(3-triethoxysilyl-1-propyl)trithiophosphate; bis-(3-triethoxysilyl-1-propyl)methyldithiophosphonate; bis-(3-triethoxysilyl-1-propyl)ethyldithiophosphonate; 3-triethoxysilyl-1-propyldi methylthiophosphinate; 3-triethoxysilyl-1-propyldiethylthiophosphinate; tris-(3-triethoxysilyl-1-propyl)tetrathiophosphate; bis-(3-triethoxysilyl-1 propyl)methyltrithiophosphonate; bis-(3-triethoxysilyl-1-propyl)ethyltrithiophosphonate; 3-triethoxysilyl-1-propyldimethyldithiophosphinate; 3-triethoxysilyl-1-propyldiethyldithiophosphinate; tris-(3-methyldimethoxysilyl-1-propyl)trithiophosphate; bis-(3-methyldimethoxysilyl-1-propyl)methyldithiophosphonate; bis-(3-methyldimethoxysilyl-1-propyl)-ethyldithiophosphonate; 3-methyldimethoxysilyl-1-propyldimethylthiophosphinate; 3-methyldimethoxysilyl-1-propyldiethylthiophosphinate; 3-triethoxysilyl-1-propylmethylthiosulfate; 3-triethoxysilyl-1-propylmethanethiosulfonate; 3-triethoxysilyl-1-propylethanethiosulfonate; 3-triethoxysilyl-1-propylbenzenethiosulfonate; 3-triethoxysilyl-1-propyltoluenethiosulfonate; 3-triethoxysilyl-1-propylnaphthalenethiosulfonate; 3-triethoxysilyl-1-propylxylenethiosulfonate; triethoxysilylmethylmethylthiosulfate; triethoxysilylmethylmethanethiosulfonate; triethoxysilylmethylethanethiosulfonate; triethoxysilylmethylbenzenethiosulfonate; triethoxysilylmethyltoluenethiosulfonate; triethoxysilylmethylnaphthalenethiosulfonate; triethoxysilylmethylxylenethiosulfonate, and the like. Mixtures of various blocked mercapto silanes can be used. A further example of a suitable blocked mercapto silane for use in certain exemplary embodiments is NXT™ silane (3-octanoylthio-1-propyltriethoxysilane), commercially available from Momentive Performance Materials Inc. of Albany, N.Y.

Non-limiting examples of pre-treated silicas (i.e., silicas that have been pre-surface treated with a silane) suitable for use in the rubber compositions of certain exemplary embodiments according to the first-third embodiments disclosed herein include, but are not limited to, Ciptane® 255 LD and Ciptane® LP (PPG Industries) silicas that have been pre-treated with a mercaptosilane, and Coupsil® 8113 (Degussa) that is the product of the reaction between organosilane Bis(triethoxysilylpropyl) polysulfide (Si69) and Ultrasil® VN3 silica. Coupsil 6508, Agilon 400™ silica from PPG Industries, Agilon 454® silica from PPG Industries, and 458® silica from PPG Industries. In those embodiments of the rubber compositions and methods disclosed herein where the silica comprises a pre-treated silica, the pre-treated silica is used in an amount as previously disclosed for the reinforcing silica filler (i.e., about 5 to about 200 phr, including 5 to 200 phr, about 10 to about 200 phr, 10 to 200 phr, about 10 to about 175 phr, 10 to 175 phr, about 25 to about 150 phr, 25 to 150 phr, about 35 to about 150 phr, 35 to 150 phr, about 25 to about 125 phr, 25 to 125 phr, about 25 to about 100 phr, 25 to 100 phr, about 25 to about 80 phr, 25 to 80 phr, about 35 to about 125 phr, 35 to 125 phr, about 35 to about 100 phr, 35 to 100 phr, about 35 to about 80 phr, and 35 to 80 phr about 5 to about 200 phr, including about 25 to about 150 phr, about 35 to about 150 phr, about 25 to about 125 phr, about 25 to about 100 phr, about 25 to about 80 phr, about 35 to about 125 phr, about 35 to about 100 phr, and about 35 to about 80 phr).

The amount of silica coupling agent used in the rubber compositions according to the first-third embodiments disclosed herein may vary. In certain embodiments of the first-third embodiments disclosed herein, the rubber compositions do not contain any silica coupling agent. In other embodiments of the first-third embodiments disclosed herein, the silica coupling agent is present in an amount sufficient to provide a ratio of the total amount of silica coupling agent to reinforcing silica filler of about 1:100 to about 1:5 (i.e., about 0.01 to about 20 parts by weight per 100 parts of silica), including 1:100 to 1:5, about 1:100 to about 1:10, 1:100 to 1:10, about 1:100 to about 1:20, 1:100 to 1:20, about 1:100 to about 1:25, and 1:100 to 1:25 as well as about 1:100 to about 0:100 and 1:100 to 0:100. In certain embodiments according to the first-third embodiments disclosed herein, the rubber composition comprises about 0.01 to about 10 phr silica coupling agent, including 0.01 to 10 phr, about 0.01 to about 5 phr, 0.01 to 5 phr, about 0.01 to about 3 phr, and 0.01 to 3 phr.

Other Components of Rubber Composition

In certain embodiments of the first-third embodiments, the rubber composition includes (i.e., further comprises) a cure package. Generally, the cure package includes at least one of: a vulcanizing agent; a vulcanizing accelerator; a vulcanizing activator (e.g., zinc oxide, stearic acid, and the like); a vulcanizing inhibitor, and an anti-scorching agent. In certain embodiments, the cure package includes at least one vulcanizing agent, at least one vulcanizing accelerator, at least one vulcanizing activator and optionally a vulcanizing inhibitor and/or an anti-scorching agent. Vulcanizing accelerators and vulcanizing activators act as catalysts for the vulcanization agent. Vulcanizing inhibitors and anti-scorching agents are known in the art and can be selected by one skilled in the art based on the vulcanizate properties desired.

Examples of suitable types of vulcanizing agents for use in the rubber compositions according to certain embodiments of the first-third embodiments, include but are not limited to, sulfur or peroxide-based curing components. Thus, in certain such embodiments, the curative component includes a sulfur-based curative or a peroxide-based curative. Examples of specific suitable sulfur vulcanizing agents include "rubbermaker's" soluble sulfur; sulfur donating curing agents, such as an amine disulfide, polymeric polysulfide, or sulfur olefin adducts; and insoluble polymeric sulfur. Preferably, the sulfur vulcanizing agent is soluble sulfur or a mixture of soluble and insoluble polymeric sulfur. For a general disclosure of suitable vulcanizing agents and other components used in curing, e.g., vulcanizing inhibitor and anti-scorching agents, one can refer to Kirk-Othmer, Encyclopedia of Chemical Technology, 3rd ed., Wiley Interscience, N.Y. 1982, Vol. 20, pp. 365 to 468, particularly Vulcanization Agents and Auxiliary Materials, pp. 390 to 402, or Vulcanization by A. Y. Coran, Encyclopedia of Polymer Science and Engineering, Second Edition (1989 John Wiley & Sons, Inc.), both of which are incorporated herein by reference. Vulcanizing agents can be used alone or in combination. Generally, the vulcanizing agents are used in an amount ranging from 0.1 to 10 phr, including from 1 to 7.5 phr, including from 1 to 5 phr, and preferably from 1 to 3.5 phr.

Vulcanizing accelerators are used to control the time and/or temperature required for vulcanization and to improve properties of the vulcanizate. Examples of suitable vulcanizing accelerators for use in the rubber compositions according to certain embodiments of the first-third embodiments disclosed herein include, but are not limited to, thiazole vulcanization accelerators, such as 2-mercaptobenzothiazole, 2,2'-dithiobis(benzothiazole) (MBTS), N-cyclohexyl-2-benzothiazole-sulfenamide (CBS), N-tert-butyl-2-benzothiazole-sulfenamide (TBBS), and the like; guanidine vulcanization accelerators, such as diphenyl guanidine (DPG) and the like; thiuram vulcanizing accelerators; carbamate vulcanizing accelerators; and the like. Generally, the amount of the vulcanization accelerator used ranges from 0.1 to 10 phr, preferably 0.5 to 5 phr.

Vulcanizing activators are additives used to support vulcanization. Generally vulcanizing activators include both an inorganic and organic component. Zinc oxide is the most widely used inorganic vulcanization activator. Various organic vulcanization activators are commonly used including stearic acid, palmitic acid, lauric acid, and zinc salts of each of the foregoing. Generally, the amount of vulcanization activator used ranges from 0.1 to 6 phr, preferably 0.5 to 4 phr.

Vulcanization inhibitors are used to control the vulcanization process and generally retard or inhibit vulcanization until the desired time and/or temperature is reached. Common vulcanization inhibitors include, but are not limited to, PVI (cyclohexylthiophthalmide) from Santogard. Generally, the amount of vulcanization inhibitor is 0.1 to 3 phr, preferably 0.5 to 2 phr.

Other ingredients that may be employed in the rubber compositions of certain embodiments of the first-third embodiments disclosed herein are well known to those of skill in the art and include oils (processing and extender), waxes, processing aids, antioxidants, tackifying resins, reinforcing resins, peptizers, and one or more additional rubbers.

Various types of processing and extender oils may be utilized, including, but not limited to aromatic, naphthenic, and low PCA oils. Suitable low PCA oils include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom. Suitable low PCA oils include mild extraction solvates (MES), treated distillate aromatic extracts (TDAE), TRAE, and heavy naphthenics. Suitable MES oils are available commercially as CATENEX SNR from SHELL, PROREX 15, and FLEXON 683 from EXXONMOBIL, VIVATEC 200 from BP, PLAX-OLENE MS from TOTAL FINA ELF, TUDALEN 4160/4225 from DAHLEKE, MES-H from REPSOL, MES from Z8, and OLIO MES S201 from AGIP. Suitable TDAE oils are available as TYREX 20 from EXXONMOBIL, VIVATEC 500, VIVATEC 180, and ENERTHENE 1849 from BP, and EXTENSOIL 1996 from REPSOL. Suitable heavy naphthenic oils are available as SHELLFLEX 794, ERGON BLACK OIL, ERGON H2000, CROSS C2000, CROSS C2400, and SAN JOAQUIN 2000L. Suitable low PCA oils also include various plant-sourced oils such as can be harvested from vegetables, nuts, and seeds. Non-limiting examples include, but are not limited to, soy or soybean oil, sunflower oil, safflower oil, corn oil, linseed oil, cotton seed oil, rapeseed oil, cashew oil, sesame oil, camellia oil, jojoba oil, macadamia nut oil, coconut oil, and palm oil. The foregoing processing oils can also be used as an extender oil, i.e., to prepare an oil-extended polymer or copolymer. Generally, for most applications the total amount of oil used (processing oil and extender oil) in the rubber compositions and methods disclosed herein ranges about 1 to about 70 phr, including 1 to 70 phr, about 2 to about 60 phr, about 2 to about 60 phr, about 3 to about 50 phr, and 3 to 50 phr. However, in certain applications, the total amount of oil used (processing oil and extender oil) in the rubber compositions and methods disclosed herein is much higher and ranges up to about 175 phr, including up to 175 phr, up to about 150 phr, up to 150 phr, up to about 100 phr, and up to 100 phr.

Various antioxidants are known to those of skill in the art and may be utilized in the rubber compositions of certain embodiments of the first-fourth embodiments; these include but are not limited to phenolic antioxidants, amine phenol antioxidants, hydroquinone antioxidants, alkyldiamine antioxidants, and amine compound antioxidants such as N-phenyl-N'-isopropyl-p-phenylenediamine (IPPD), or N-(1,3-dimethylbutyl)-N'-phenyl-phenylenediamine (6PPD). One or more than one type as well as one or more than one of each type may be utilized in certain embodiments of the first-third embodiments. In certain embodiments of the first-third embodiments, the total amount of antioxidant(s) used is 0.1 to 6 phr Viscosity Reduction in Rubber Compositions As discussed above, the third embodiment disclosed herein is a method for reducing the viscosity of a silica-filler-containing rubber composition. The method comprises the use of a rubber composition comprising at least one rubber, about 5 to 200 phr (including 5 to 200 phr) of a reinforcing silica filler, and a whey protein component in an amount sufficient to provide about 0.1 to about 10 phr (including 0.1 to 10 phr) of whey protein. The reduction in viscosity from the use of whey protein should also be understood to occur in the rubber compositions of the first and second embodiments disclosed herein.

In certain embodiments according to the first-third embodiment, the reduction in viscosity from the use of about 0.1 to about 10 phr of whey protein is at least about 5% (as compared to a rubber composition containing the same ingredients except for lacking any whey protein). In certain embodiments according to the first-third embodiment, the reduction in viscosity from the use of 0.1 to 10 phr of whey protein is at least 5% (as compared to a rubber composition containing the same ingredients except for lacking any whey protein). In certain embodiments according to the first-embodiment, the rubber composition contains no silica coupling agent and the reduction in viscosity from the use of about 0.1 to about 10 phr of whey protein is at least about 10%, including at least about 20%, and in certain such embodiments at least about 30%, about 10% to about 50%, about 10% to about 45%, about 20% to about 50% and about 20% to about 45% (as compared to a rubber composition containing the same ingredients except for lacking any whey protein). In certain embodiments according to the first-embodiment, the rubber composition contains no silica coupling agent and the reduction in viscosity from the use of 0.1 to 10 phr of whey protein is at least 10%, including at least 20%, and in certain such embodiments at least 30%, 10% to 50%, 10% to 45%, 20% to 50% and 20% to 45% (as compared to a rubber composition containing the same ingredients except for lacking any whey protein).

Generally, the useful upper range for the amount of silica filler in rubber compositions can be considered to be somewhat limited by the high viscosity imparted to the rubber composition by fillers of this type. It is believed that silica filler particles tend to aggregate in the rubber composition, and aggregates of the silica filler particles then contribute to increased viscosity of the rubber composition. Rubber compositions with high viscosity are more difficult to process, and high viscosity makes it more difficult to homogeneously blend the various components in the rubber composition. It is therefore desirable to add processing aids to the rubber composition to prevent aggregation of the silica particles, reduce the viscosity, and improve the processibility and blending of the rubber composition.

As discussed above, silica coupling agents typically have been added to rubber compositions to prevent aggregation of the silica filler particles and reduce the viscosity of the rubber composition. However, silica coupling agents have limitations. First, they are expensive, and therefore add to the cost of manufacturing rubber compositions and the tires or tire components made from these rubber compositions. Because of the expense, rubber manufacturers are interested in minimizing the amount of silica coupling agents in rubber compositions. Second, certain silica coupling agents may release volatile organic compounds (e.g., methanol, ethanol, or propanol) when they are incorporated into rubber compositions which can be undesirable.

Unexpectedly, it has been discovered that when whey protein is used in a rubber composition comprising a reinforcing silica filler, the viscosity of the rubber composition is reduced and the rubber composition can be processed more easily. This reduction in viscosity of the rubber composition occurs even when the amount of the silica coupling agent used in the rubber composition is less than about 8% of the amount of silica (i.e., less than 8 parts silica coupling agent to 100 parts of reinforcing silica filler), e.g., from about 0 to about 4% of the amount of silica. Thus, by including whey protein in the rubber composition, the amount of silica coupling agent can be reduced to less than the amount of silica coupling agent typically used in rubber compositions comprising reinforcing silica filler. The resulting rubber compositions have comparable processability and physical properties when compared with typical rubber compositions with higher amounts of silica coupling agent.

Methods for Preparing Rubber Compositions

Also disclosed herein are methods for preparing rubber compositions. The rubber compositions according to the first-third embodiments disclosed herein may generally be formed by mixing together the ingredients for the rubber composition (as disclosed above) by methods known in the art, such as, for example, by kneading the ingredients together in a Banbury mixer or on a milled roll. The methods generally include at least one non-productive master-batch mixing stage and a final productive mixing stage. The term non-productive master-batch stage is known to those of skill in the art and generally understood to be a mixing stage where no vulcanizing agents or vulcanization accelerators are added. The term final productive mixing stage is also known to those of skill in the art and generally understood to be the mixing stage where the vulcanizing agents and vulcanization accelerators are added into the rubber composition. In certain embodiments of the compositions and methods disclosed herein, more than one non-productive master-batch mixing stage may be used. In certain embodiments of the compositions and methods disclosed herein, more than one non-productive master-batch mixing stage is used and the whey protein component is added in the first (initial) master-batch stage. In other embodiments of the compositions and methods disclosed herein, at least two non-productive master-batch mixing stages are used and the whey protein component is added in the second master-batch stage. In yet other embodiments of the compositions and methods disclosed herein, more than one non-productive master-batch mixing stage is used and the whey protein component is added in the last non-productive master-batch mixing stage.

In certain embodiments of the methods for preparing rubber compositions according to the first-third embodiments disclosed herein, the non-productive master batch mixing stage(s) may be conducted at a temperature of about 130° C. to about 200° C. In certain embodiments, the final productive mixing stage may be conducted at a temperature below the vulcanization temperature in order to avoid unwanted pre-cure of the rubber composition. Therefore, the temperature of the productive mixing stage should not exceed about 120° C. and is typically about 40° C. to about 120° C., or about 60° C. to about 110° C. and, especially, about 75° C. to about 100° C.

In certain embodiments of the first-third embodiments disclosed herein, a rubber composition is prepared according to a method that includes at least one non-productive mixing stage and at least one productive mixture stage. In certain embodiments, the method for preparing the rubber compositions of the present disclosure includes: (1) mixing, in at least one non-productive master-batch stage, a rubber composition comprising: 100 phr of at least one rubber; from about 5 to about 200 phr (including 5 to 200 phr) of reinforcing silica filler; and a whey protein component in an amount sufficient to provide about 0.1 to about 10 phr whey (including 0.1 to 10 phr) protein; and (2) mixing the resulting product of the non-productive master batch in a final productive stage along with at least one curative, such as a curative package, as discussed above. With respect to certain embodiments of the first embodiment disclosed herein, the list of ingredients should be understood as including ingredients to be mixed to form the rubber composition. Accordingly, in such embodiments, the whey protein is added via a whey protein component which usually is not 100% whey protein. With respect to the certain embodiments of the second embodiment disclosed herein (i.e., a rubber composition that has been subjected to curing), the list of ingredients should be understood to comprise the ingredients present in the cured rubber composition such that the amount of whey protein can be measured without regard to its particular source (e.g., without regard to the particular whey protein component used to provide the whey protein).

In certain embodiments of the first-third embodiments disclosed herein, a rubber composition is prepared according to a method that includes at least one non-productive mixing stage and at least one productive mixing stage. In certain embodiments of the first-third embodiments disclosed herein, the method for preparing the rubber compositions of the present disclosure includes: (1) mixing, in at least one non-productive master-batch stage, a rubber composition comprising: 100 phr of at least one rubber; from about 5 to about 200 phr (including 5 to 200 phr) of reinforcing silica filler; a whey protein component in an amount sufficient to provide about 0.1 to about 10 phr (including 0.1 to 10 phr) whey protein; and about 0.5 to about 20 phr (including 0.5 to 20 phr) of a silica coupling agent; and (2) mixing the resulting product of the non-productive master batch in a final productive stage along with at least one curative, such as a cure package, as discussed above. In certain such embodiments, the silica coupling agent is used in an amount such that the weight ratio of the silica coupling agent to reinforcing silica filler is about 1:100 to about 1:20 (including 1:100 to 1:20).

As previously discussed, certain embodiments disclosed herein include tires, tire treads, and tire sidewalls comprising a rubber composition of the first-third embodiments as otherwise disclosed herein, i.e., comprising at least one rubber, about 5 to about 200 phr (including 5 to 200 phr) of a reinforcing silica filler, and a whey protein component in an amount sufficient to provide about 0.1 to about 10 phr (including 0.1 to 10 phr) whey protein (or when referring to a cured rubber composition, about 0.1 to about 10 phr of whey protein (including 0.1 to 10 phr of whey protein)). More specifically, the present disclosure includes a tire comprising a rubber composition of the first-third embodiments as otherwise disclosed herein, a tire comprising a tire tread comprising a rubber composition of the first-third embodiments as otherwise disclosed herein, a tire tread comprising a rubber composition of the first-third embodiments as otherwise disclosed herein, a tire comprising a tire sidewall comprising a rubber composition of the first-third embodiments as otherwise disclosed herein, and a tire sidewall comprising a rubber composition of the first-third embodiments as otherwise disclosed herein. Generally, when the rubber compositions of the first-third embodiments disclosed herein are utilized in tires, tire treads, or tire sidewalls, these compositions are processed into tire components according to ordinary tire manufacturing techniques including standard rubber shaping, molding, and curing techniques. Any of the various rubber tire components can be fabricated including, but not limited to, treads, sidewalls, belt skims, and carcass. Typically, vulcanization of a tire component is effected by heating the vulcanizable composition in a mold; e.g., it may be heated to about 140° C. to about 180° C. Cured or crosslinked rubber compositions may be referred to as vulcanizates, which generally contain three-dimensional polymeric networks that are thermoset. The other ingredients, such as processing aides and fillers, may be evenly dispersed throughout the vulcanized network. In certain embodiments, pneumatic tires containing the rubber compositions as disclosed herein can be produced as discussed in U.S. Pat. Nos. 5,866,171, 5,876,527, 5,931,211, and 5,971,046, which are incorporated herein by reference.

EXAMPLES

The following examples illustrate specific and exemplary embodiments and/or features of the embodiments of the present disclosure. The examples are provided solely for the purposes of illustration and should not be construed as limitations of the present disclosure. Numerous variations over these specific examples are possible without departing from the spirit and scope of the presently disclosed embodiments. It should specifically be understood that the whey protein utilized in the examples (both type and amount) can be utilized with rubbers, fillers, and other ingredients which differ in amount, composition, or both from those used in the examples (i.e., as fully disclosed in the preceding paragraphs). Moreover, whey protein can be utilized in amounts and from sources that differ from those provided in the examples (i.e., as fully disclosed in the preceding paragraphs).

In Examples 1-9, rubber compositions containing reinforcing silica filler were prepared using various rubbers along with varying amounts of whey protein and silica coupling agent. Example 1 utilizes natural rubber in combination with polybutadiene, Example 2 utilizes synthetic polyisoprene rubber in combination with polybutadiene, Example 3 utilizes polybutadiene in combination with natural rubber, Example 4 utilizes styrene-butadiene rubber in combination with natural rubber, Example 5 utilizes a relatively higher surface area silica (as compared to Examples 1-4) with natural rubber, Example 6 utilizes a mercapto silane in combination with natural rubber and polybutadiene, Example 7 utilizes a pre-reacted silica with natural rubber and styrene-butadiene rubber, Example 8 utilizes alternative whey protein components (sweet whey or whey protein isolate) in combination with natural rubber and polybutadiene, and Example 9 utilizes natural rubber and polybutadiene with varying placement of the whey protein component. The rubber compositions were prepared in a four stage mixing process (i.e., two master-batch stages, remilling, and final batch) according to the formulations shown in Tables 1A-6A. The amount of each ingredient used is reported as parts per hundred rubber (phr). The mixing process used for these formulations is outlined in Table 1B below. The whey protein component utilized in Examples 1-7 and 9 was acid whey (containing approximately 12 weight % protein). For Example 8, the sweet whey contained approximately 12 weight % protein, the whey protein isolate contained approximately 92 weight % protein and the acid whey was the same as used in Examples 1-6 and 8 (i.e., containing approximately 12 weight % protein).

After curing, each of the rubber compositions was tested for tensile properties. The results testing of the formulations of Tables 1A-9A are shown in Tables 1D-9D, below. The abbreviation Eb is used for elongation at break and Tb for stress at break, which measurements provide an indication of a rubber composition's tear resistance, which is particularly relevant when it is incorporated into a tire tread. The abbreviation M300 is used for tensile stress at 300% elongation. The abbreviation E' is used for dynamic storage modulus, which provides a measure of the hardness of the rubber composition; steering stability on a dry road surface (dry performance) is generally impacted by E' with higher values preferred. The index values listed in Tables 1D-9D were determined by comparing the value for the formulation according to the present disclosure with the respective value for the control (i.e., dividing the test value by the control value).

Tensile mechanical properties of the samples were determined following the guidelines, but not restricted to, the standard procedure described in ASTM D-412, using dumbbell-shaped samples with a cross-section dimension of 4 mm in width and 1.9 mm in thickness at the center. Specimens were strained at a constant rate and the resulting force was recorded as a function of extension (strain). Force readings are shown in the Tables below as engineering-stresses by reference to the original cross-sectional area of the test piece. The specimens were tested at 25° C. unless indicated to the contrary. Samples were cured for 40 minutes at 150° C.

The dynamic storage modulus (E') and tan δ values were measured with a dynamic mechanical thermal spectrometer (Eplexor® 500N from Gabo Qualimeter Testantalgen GmbH of Ahiden, Germany) under the following conditions: measurement mode: tensile test mode, measuring frequency: 52 Hz, applying 0.2% strain from 50 to −5° C. and 1% strain from −5 to 65° C., measuring temperatures (as indicated in Table 1C below), sample shape: 4.75 mm wide×29 mm long×2.0 mm thick. A rubber composition's tan δ at 0° C. is indicative of its wet traction when incorporated into a tire tread, its tan δ at 30° C. is indicative of its dry traction when incorporated into a tire tread and its tan δ at 60° C. is indicative of its rolling resistance when incorporated into a tire tread.

The MH and ML values were measured using a moving die cure Monsanto rheometer MDR 2000 from Alpha Technologies at 160° C., following the guidelines of, but not restricted to, ASTM-D 2084. Measurements were in kg-cm prior to preparing index values. MH represents maximum torque and ML represents minimum torque.

The viscosities disclosed herein are real dynamic viscosities determined using an Alpha Technologies RPA (Rubber Process Analyzer) instrument which is rotorless. Measurements were made following the guidance of, but not strictly according to ASTM D 6204. In accordance with ASTM D 6204, a three point frequency sweep was conducted. The rubber compositions were pre-heated for 1 minute at 130° C. In accordance with the ASTM procedure, strain sweep was conducted at 130° C., strain at 100 percent, and 1 Hz were conducted. The viscosity data reported is from a run conducted at 266° F., G' at 0.2 minutes.

TABLE 1A

Rubber Formulations Based on Natural Rubber

| Sample # | 1-1* | 1-2 | 1-3 | 1-4* | 1-5 | 1-6 | 1-7* | 1-8 | 1-9 |
|---|---|---|---|---|---|---|---|---|---|
| Master-Batch #1 | | | | | | | | | |
| Natural rubber | 50 | 50 | 50 | 50 | 50 | 50 | 50 | 50 | 50 |
| Polybutadiene[1] | 50 | 50 | 50 | 50 | 50 | 50 | 50 | 50 | 50 |
| Silica filler[2] | 56 | 56 | 56 | 56 | 56 | 56 | 56 | 56 | 56 |
| Silica coupling agent[3] | 0 | 0 | 0 | 2.24 | 2.24 | 2.24 | 4.48 | 4.48 | 4.48 |
| Silica coupling agent (% based on amount of silica) | 0 | 0 | 0 | 4 | 4 | 4 | 8 | 8 | 8 |
| Whey protein component (acid whey) | 0 | 5 | 10 | 0 | 5 | 10 | 0 | 5 | 10 |

TABLE 1A-continued

Rubber Formulations Based on Natural Rubber

| Sample # | 1-1* | 1-2 | 1-3 | 1-4* | 1-5 | 1-6 | 1-7* | 1-8 | 1-9 |
|---|---|---|---|---|---|---|---|---|---|
| Whey protein (from WPC) | 0 | 0.6 | 1.2 | 0 | 0.6 | 1.2 | 0 | 0.6 | 1.2 |
| Processing oil | 10 | 10 | 10 | 10 | 10 | 10 | 10 | 10 | 10 |
| Antioxidant #1 | 1.5 | 1.5 | 1.5 | 1.5 | 1.5 | 1.5 | 1.5 | 1.5 | 1.5 |
| Vulcanization activator #1 | 1.5 | 1.5 | 1.5 | 1.5 | 1.5 | 1.5 | 1.5 | 1.5 | 1.5 |
| Master-Batch #2 | | | | | | | | | |
| Carbon black | 10 | 10 | 10 | 10 | 10 | 10 | 10 | 10 | 10 |
| Antioxidant #2 | 0.95 | 0.95 | 0.95 | 0.95 | 0.95 | 0.95 | 0.95 | 0.95 | 0.95 |
| Final Batch | | | | | | | | | |
| Vulcanization activator #2 | 2 | 2 | 2 | 2 | 2 | 2 | 2 | 2 | 2 |
| Vulcanizing agent (sulfur) | 2.1 | 2.1 | 2.1 | 2.1 | 2.1 | 2.1 | 2.1 | 2.1 | 2.1 |
| Vulcanization accelerators | 1.65 | 1.65 | 1.65 | 1.65 | 1.65 | 1.65 | 1.65 | 1.65 | 1.65 |

[1] High-cis polybutadiene (cis-bond content 96%)
[2] commercially available silica filler having a surface area ($N_2SA$) of about 190-210 $m^2/g$
[3] commercially available silica coupling agent of the trialkoxy disulfide type (bis(triethoxysilylpropyl) disulfide)
*denotes control (with respective test values listed to the right of each control)

TABLE 1B

Mixing Parameters for silica-containing compositions

| Stage | Time | Condition |
|---|---|---|
| Master-Batch Stage 1 (initial temp: 105° C., rotor rpm started at 60) | 0 seconds<br>30 seconds | Charge polymers<br>Charge any oil, silica filler and other master-batch ingredients, increase rotor to 75 rpm<br>Drop based on max temperature of 310° F. (154° C.) |
| Master-Batch Stage 2 (initial temp: 105° C., rotor rpm started at 60) | 0 seconds | Charge additional ingredients listed under Master-Batch #2<br>Drop based on max temperature of 300° F. (149° C.) |
| Remill Stage (initial temp: 105° C., rotor rpm at 60) | 0 seconds | Charge Master Batch from #2<br>Drop based on max temperature of 300° F. (149° C.) |
| Final Batch Stage (initial temp: 80° C., rotor rpm at 40) | 0 seconds<br>0 seconds | Charge Remill<br>Charge curatives<br>Drop based on max temperature of 210° F. (99° C.) |

TABLE 2A

Rubber Formulations Based on Synthetic Polyisoprene Rubber

| | Sample # | | | | | | | | |
|---|---|---|---|---|---|---|---|---|---|
| | 2-1* | 2-2 | 2-3 | 2-4* | 2-5 | 2-6 | 2-7* | 2-8 | 2-9 |
| Master-Batch #1 | | | | | | | | | |
| Polyisoprene | 80 | 80 | 80 | 80 | 80 | 80 | 80 | 80 | 80 |
| Polybutadiene[1] | 20 | 20 | 20 | 20 | 20 | 20 | 20 | 20 | 20 |
| Silica filler[2] | 56 | 56 | 56 | 56 | 56 | 56 | 56 | 56 | 56 |
| Silica coupling agent[3] | 0 | 0 | 0 | 2.24 | 2.24 | 2.24 | 4.48 | 4.48 | 4.48 |
| Silica coupling agent (% based on amount of silica) | 0 | 0 | 0 | 4 | 4 | 4 | 8 | 8 | 8 |

TABLE 2A-continued

Rubber Formulations Based on Synthetic Polyisoprene Rubber

| | Sample # | | | | | | | | |
|---|---|---|---|---|---|---|---|---|---|
| | 2-1* | 2-2 | 2-3 | 2-4* | 2-5 | 2-6 | 2-7* | 2-8 | 2-9 |
| Whey protein component (acid whey) | 0 | 5 | 10 | 0 | 5 | 10 | 0 | 5 | 10 |
| Whey protein (from WPC) | 0 | 0.6 | 1.2 | 0 | 0.6 | 1.2 | 0 | 0.6 | 1.2 |
| Processing oil | 10 | 10 | 10 | 10 | 10 | 10 | 10 | 10 | 10 |
| Antioxidant #1 | 1.5 | 1.5 | 1.5 | 1.5 | 1.5 | 1.5 | 1.5 | 1.5 | 1.5 |
| Stearic acid | 1.5 | 1.5 | 1.5 | 1.5 | 1.5 | 1.5 | 1.5 | 1.5 | 1.5 |
| Master-Batch #2 | | | | | | | | | |
| Carbon black | 10 | 10 | 10 | 10 | 10 | 10 | 10 | 10 | 10 |
| Antioxidant #2 | 0.95 | 0.95 | 0.95 | 0.95 | 0.95 | 0.95 | 0.95 | 0.95 | 0.95 |
| Final Batch | | | | | | | | | |
| Vulcanization activator (Zinc oxide) | 2 | 2 | 2 | 2 | 2 | 2 | 2 | 2 | 2 |
| Vulcanizing agent (sulfur) | 2.1 | 2.1 | 2.1 | 2.1 | 2.1 | 2.1 | 2.1 | 2.1 | 2.1 |
| Vulcanization accelerators | 1.65 | 1.65 | 1.65 | 1.65 | 1.65 | 1.65 | 1.65 | 1.65 | 1.65 |

[1] High-cis polybutadiene (cis-bond content 96%)
[2] commercially available silica filler having a surface area (N$_2$SA) of about 190-210 m$^2$/g
[3] commercially available silica coupling agent of the trialkoxy disulfide type(bis(triethoxysilylpropyl) disulfide)
*denotes control (with respective test values listed to the right of each control)

TABLE 3A

Rubber Formulations Based on Polybutadiene

| | Sample # | | | | | | | | |
|---|---|---|---|---|---|---|---|---|---|
| | 3-1* | 3-2 | 3-3 | 3-4* | 3-5 | 3-6 | 3-7* | 3-8 | 3-9 |
| Master-Batch #1 | | | | | | | | | |
| Polybutadiene[1] | 80 | 80 | 80 | 80 | 80 | 80 | 80 | 80 | 80 |
| Natural rubber | 20 | 20 | 20 | 20 | 20 | 20 | 20 | 20 | 20 |
| Silica filler[2] | 56 | 56 | 56 | 56 | 56 | 56 | 56 | 56 | 56 |
| Silica coupling agent[3] | 0 | 0 | 0 | 2.24 | 2.24 | 2.24 | 4.48 | 4.48 | 4.48 |
| Silica coupling agent (% based on amount of silica) | 0 | 0 | 0 | 4 | 4 | 4 | 8 | 8 | 8 |
| Whey protein component (acid whey) | 0 | 5 | 10 | 0 | 5 | 10 | 0 | 5 | 10 |
| Whey protein (from WPC) | 0 | 0.6 | 1.2 | 0 | 0.6 | 1.2 | 0 | 0.6 | 1.2 |
| Processing oil | 10 | 10 | 10 | 10 | 10 | 10 | 10 | 10 | 10 |
| Antioxidant #1 | 1.5 | 1.5 | 1.5 | 1.5 | 1.5 | 1.5 | 1.5 | 1.5 | 1.5 |
| Stearic acid | 1.5 | 1.5 | 1.5 | 1.5 | 1.5 | 1.5 | 1.5 | 1.5 | 1.5 |
| Master-Batch #2 | | | | | | | | | |
| Carbon black | 10 | 10 | 10 | 10 | 10 | 10 | 10 | 10 | 10 |
| Antioxidant #2 | 0.95 | 0.95 | 0.95 | 0.95 | 0.95 | 0.95 | 0.95 | 0.95 | 0.95 |
| Final Batch | | | | | | | | | |
| Vulcanization activator (Zinc oxide) | 2 | 2 | 2 | 2 | 2 | 2 | 2 | 2 | 2 |
| Vulcanizing agent (sulfur) | 2.1 | 2.1 | 2.1 | 2.1 | 2.1 | 2.1 | 2.1 | 2.1 | 2.1 |
| Vulcanization accelerators | 1.65 | 1.65 | 1.65 | 1.65 | 1.65 | 1.65 | 1.65 | 1.65 | 1.65 |

[1] High-cis polybutadiene (cis-bond content 96%)
[2] commercially available silica filler having a surface area (N$_2$SA) of about 190-210 m$^2$/g
[3] commercially available silica coupling agent of the trialkoxy disulfide type (bis(triethoxysilylpropyl) disulfide)
*denotes control (with respective test values listed to the right of each control)

TABLE 4A

Rubber Formulations Based on Styrene-Butadiene Rubber

| | Sample # | | | | | | | | |
|---|---|---|---|---|---|---|---|---|---|
| | 4-1* | 4-2 | 4-3 | 4-4* | 4-5 | 4-6 | 4-7* | 4-8 | 4-9 |
| Master-Batch #1 | | | | | | | | | |
| Styrene-butadiene copolymer[1] | 80 | 80 | 80 | 80 | 80 | 80 | 80 | 80 | 80 |
| Natural rubber | 20 | 20 | 20 | 20 | 20 | 20 | 20 | 20 | 20 |
| Silica filler[2] | 56 | 56 | 56 | 56 | 56 | 56 | 56 | 56 | 56 |
| Silica coupling agent[3] | 0 | 0 | 0 | 2.24 | 2.24 | 2.24 | 4.48 | 4.48 | 4.48 |
| Silica coupling agent (% based on amount of silica) | 0 | 0 | 0 | 4 | 4 | 4 | 8 | 8 | 8 |
| Whey protein component (acid whey) | 0 | 5 | 10 | 0 | 5 | 10 | 0 | 5 | 10 |
| Whey protein (from WPC) | 0 | 0.6 | 1.2 | 0 | 0.6 | 1.2 | 0 | 0.6 | 1.2 |
| Processing oil | 10 | 10 | 10 | 10 | 10 | 10 | 10 | 10 | 10 |
| Antioxidant #1 | 1.5 | 1.5 | 1.5 | 1.5 | 1.5 | 1.5 | 1.5 | 1.5 | 1.5 |
| Stearic acid | 1.5 | 1.5 | 1.5 | 1.5 | 1.5 | 1.5 | 1.5 | 1.5 | 1.5 |
| Master-Batch #2 | | | | | | | | | |
| Carbon black | 10 | 10 | 10 | 10 | 10 | 10 | 10 | 10 | 10 |
| Antioxidant #2 | 0.95 | 0.95 | 0.95 | 0.95 | 0.95 | 0.95 | 0.95 | 0.95 | 0.95 |
| Final Batch | | | | | | | | | |
| Vulcanization activator (Zinc oxide) | 2 | 2 | 2 | 2 | 2 | 2 | 2 | 2 | 2 |
| Vulcanizing agent (sulfur) | 2.1 | 2.1 | 2.1 | 2.1 | 2.1 | 2.1 | 2.1 | 2.1 | 2.1 |
| Vulcanization accelerators | 1.65 | 1.65 | 1.65 | 1.65 | 1.65 | 1.65 | 1.65 | 1.65 | 1.65 |

[1]Styrene-butadiene rubber (tin coupled, with 17% cis, 25% trans, 58% vinyl, 20% styrene, Tg of −33° C. Tg, 405,000 Mw, 250,000 Mn)
[2]commercially available silica filler having a surface area (N$_2$SA) of about 190-210 m$^2$/g
[3]commercially available silica coupling agent of the trialkoxy disulfide type (bis(triethoxysilylpropyl) disulfide)
*denotes control (with respective test values listed to the right of each control)

TABLE 5A

Rubber Formulations Containing High Surface Area Silica

| | Sample # | | | | | | | | |
|---|---|---|---|---|---|---|---|---|---|
| | 5-1* | 5-2 | 5-3 | 5-4* | 5-5 | 5-6 | 5-7* | 5-8 | 5-9 |
| Master-Batch #1 | | | | | | | | | |
| Natural rubber | 80 | 80 | 80 | 80 | 80 | 80 | 80 | 80 | 80 |
| Polybutadiene[1] | 20 | 20 | 20 | 20 | 20 | 20 | 20 | 20 | 20 |
| Silica filler[2] | 56 | 56 | 56 | 56 | 56 | 56 | 56 | 56 | 56 |
| Silica coupling agent[3] | 0 | 0 | 0 | 2.24 | 2.24 | 2.24 | 4.48 | 4.48 | 4.48 |
| Silica coupling agent (% based on amount of silica) | 0 | 0 | 0 | 4 | 4 | 4 | 8 | 8 | 8 |
| Whey protein component (acid whey) | 0 | 5 | 10 | 0 | 5 | 10 | 0 | 5 | 10 |
| Whey protein (from WPC) | 0 | 0.6 | 1.2 | 0 | 0.6 | 1.2 | 0 | 0.6 | 1.2 |
| Processing oil | 10 | 10 | 10 | 10 | 10 | 10 | 10 | 10 | 10 |
| Antioxidant #1 | 1.5 | 1.5 | 1.5 | 1.5 | 1.5 | 1.5 | 1.5 | 1.5 | 1.5 |
| Stearic acid | 1.5 | 1.5 | 1.5 | 1.5 | 1.5 | 1.5 | 1.5 | 1.5 | 1.5 |
| Master-Batch #2 | | | | | | | | | |
| Carbon black | 10 | 10 | 10 | 10 | 10 | 10 | 10 | 10 | 10 |
| Antioxidant #2 | 0.95 | 0.95 | 0.95 | 0.95 | 0.95 | 0.95 | 0.95 | 0.95 | 0.95 |
| Final Batch | | | | | | | | | |
| Vulcanization activator (Zinc oxide) | 2 | 2 | 2 | 2 | 2 | 2 | 2 | 2 | 2 |

TABLE 5A-continued

Rubber Formulations Containing High Surface Area Silica

| | Sample # | | | | | | | | |
|---|---|---|---|---|---|---|---|---|---|
| | 5-1* | 5-2 | 5-3 | 5-4* | 5-5 | 5-6 | 5-7* | 5-8 | 5-9 |
| Vulcanizing agent (sulfur) | 2.1 | 2.1 | 2.1 | 2.1 | 2.1 | 2.1 | 2.1 | 2.1 | 2.1 |
| Vulcanization accelerators | 1.65 | 1.65 | 1.65 | 1.65 | 1.65 | 1.65 | 1.65 | 1.65 | 1.65 |

[1]High-cis polybutadiene (cis-bond content 96%)
[2]commercially available silica filler having a surface area ($N_2SA$) of about 270-305 $m^2/g$
[3]commercially available silica coupling agent of the trialkoxy disulfide type (bis(triethoxysilylpropyl) disulfide)
*denotes control (with respective test values listed to the right of each control)

TABLE 6A

Rubber Formulations Containing Silica and Mercapto Silane

| | Sample # | | | | | | | | |
|---|---|---|---|---|---|---|---|---|---|
| | 6-1* | 6-2 | 6-3 | 6-4* | 6-5 | 6-6 | 6-7* | 6-8 | 6-9 |
| Master-Batch #1 | | | | | | | | | |
| Natural rubber | 80 | 80 | 80 | 80 | 80 | 80 | 80 | 80 | 80 |
| Polybutadiene[1] | 20 | 20 | 20 | 20 | 20 | 20 | 20 | 20 | 20 |
| Silica filler[2] | 56 | 56 | 56 | 56 | 56 | 56 | 56 | 56 | 56 |
| Silica coupling agent[3] | 0 | 0 | 0 | 2.24 | 2.24 | 2.24 | 4.48 | 4.48 | 4.48 |
| Silica coupling agent (% based on amount of silica) | 0 | 0 | 0 | 4 | 4 | 4 | 8 | 8 | 8 |
| Whey protein component (acid whey) | 0 | 5 | 10 | 0 | 5 | 10 | 0 | 5 | 10 |
| Whey protein (from WPC) | 0 | 0.6 | 1.2 | 0 | 0.6 | 1.2 | 0 | 0.6 | 1.2 |
| Processing oil | 10 | 10 | 10 | 10 | 10 | 10 | 10 | 10 | 10 |
| Antioxidant #1 | 1.5 | 1.5 | 1.5 | 1.5 | 1.5 | 1.5 | 1.5 | 1.5 | 1.5 |
| Stearic acid | 1.5 | 1.5 | 1.5 | 1.5 | 1.5 | 1.5 | 1.5 | 1.5 | 1.5 |
| Master-Batch #2 | | | | | | | | | |
| Carbon black | 10 | 10 | 10 | 10 | 10 | 10 | 10 | 10 | 10 |
| Antioxidant #2 | 0.95 | 0.95 | 0.95 | 0.95 | 0.95 | 0.95 | 0.95 | 0.95 | 0.95 |
| Final Batch | | | | | | | | | |
| Vulcanization activator (Zinc oxide) | 2 | 2 | 2 | 2 | 2 | 2 | 2 | 2 | 2 |
| Vulcanizing agent (sulfur) | 2.1 | 2.1 | 2.1 | 2.1 | 2.1 | 2.1 | 2.1 | 2.1 | 2.1 |
| Vulcanization accelerators | 1.65 | 1.65 | 1.65 | 1.65 | 1.65 | 1.65 | 1.65 | 1.65 | 1.65 |

[1]High-cis polybutadiene (cis-bond content 96%)
[2]commercially available silica filler having a surface area ($N_2SA$) of about 190-210 $m^2/g$
[3]commercially available mercapto-group containing silica coupling agent
*denotes control (with respective test values listed to the right of each control)

TABLE 7A

Rubber Formulations Containing Pre-reacted Silane

| | Sample # | | | | | |
|---|---|---|---|---|---|---|
| | 7-1* | 7-2 | 7-3 | 7-4* | 7-5 | 7-6 |
| Master-Batch #1 | | | | | | |
| Natural rubber | 10 | 10 | 10 | 10 | 10 | 10 |
| Styrene-butadiene rubber[1] | 123.75 | 123.75 | 123.75 | 123.75 | 123.75 | 123.75 |

TABLE 7A-continued

Rubber Formulations Containing Pre-reacted Silane

| | 7-1* | 7-2 | 7-3 | 7-4* | 7-5 | 7-6 |
|---|---|---|---|---|---|---|
| Pre-reacted silica[2] | 56 | 56 | 56 | 80 | 80 | 80 |
| Whey protein component (acid whey) | 0 | 5 | 10 | 0 | 5 | 10 |
| Whey protein (from WPC) | 0 | 0.6 | 1.2 | 0 | 0.6 | 1.2 |
| Processing oil | 1.9 | 1.9 | 1.9 | 1.9 | 1.9 | 1.9 |
| Antioxidant #1 | 1.5 | 1.5 | 1.5 | 1.5 | 1.5 | 1.5 |
| Stearic acid | 1.5 | 1.5 | 1.5 | 1.5 | 1.5 | 1.5 |
| Master-Batch #2 | | | | | | |
| Carbon black | 10 | 10 | 10 | 10 | 10 | 10 |
| Antioxidant #2 | 0.95 | 0.95 | 0.95 | 0.95 | 0.95 | 0.95 |
| Final Batch | | | | | | |
| Vulcanization activator (Zinc oxide) | 2 | 2 | 2 | 2 | 2 | 2 |
| Vulcanizing agent (sulfur) | 2.1 | 2.1 | 2.1 | 2.1 | 2.1 | 2.1 |
| Vulcanization accelerators | 3.6 | 3.6 | 3.6 | 3.6 | 3.6 | 3.6 |

[1]Styrene-butadiene rubber (containing 40.5% styrene), oil-extended with 37.5 phr oil
[2]Commercially available silica pre-treated with mercaptosilane
*denotes control (with respective test values listed to the right of each control)

TABLE 8A

Rubber Formulations Containing Varying Whey Protein Components

| | 8-1* | 8-2 | 8-3 | 8-4 |
|---|---|---|---|---|
| Master-Batch #1 | | | | |
| Natural rubber | 80 | 80 | 80 | 80 |
| Polybutadiene[1] | 20 | 20 | 20 | 20 |
| Silica filler[2] | 56 | 56 | 56 | 56 |
| Silica coupling agent[3] | 2.24 | 2.24 | 2.24 | 2.24 |
| Whey protein component (acid whey) | 0 | 5 | 0 | 0 |
| Whey protein component (sweet whey) | 0 | 0 | 5 | 0 |
| Whey protein component (whey protein isolate) | 0 | 0 | 0 | 5 |
| Whey protein (from WPC) | 0 | 0.6 | 0.6 | 0.9 |
| Processing oil | 10 | 10 | 10 | 10 |
| Antioxidant #1 | 1.5 | 1.5 | 1.5 | 1.5 |
| Stearic acid | 1.5 | 1.5 | 1.5 | 1.5 |
| Master-Batch #2 | | | | |
| Carbon black | 10 | 10 | 10 | 10 |
| Antioxidant #2 | 0.95 | 0.95 | 0.95 | 0.95 |
| Final Batch | | | | |
| Vulcanization activator (Zinc oxide) | 2 | 2 | 2 | 2 |
| Vulcanizing agent (sulfur) | 2.1 | 2.1 | 2.1 | 2.1 |
| Vulcanization accelerators | 1.65 | 1.65 | 1.65 | 1.65 |

[1]High-cis polybutadiene (cis-bond content 96%)
[2]commercially available silica filler having a surface area ($N_2SA$) of about 190-210 $m^2/g$
[3]commercially available mercapto-group containing silica coupling agent
*denotes control (with respective test values listed to the right of each control)

TABLE 9A

Rubber Formulations With Varying Placement of Whey Protein

| | 9-1* | 9-2 | 9-3 |
|---|---|---|---|
| Master-Batch #1 | | | |
| Natural rubber | 80 | 80 | 80 |
| Polybutadiene[1] | 20 | 20 | 20 |
| Silica filler[2] | 56 | 56 | 56 |
| Silica coupling agent[3] | 2.24 | 2.24 | 2.24 |
| Silica coupling agent (% based on amount of silica) | 4 | 4 | 4 |
| Whey protein component (acid whey) | 0 | 10 | 0 |
| Whey protein (from WPC) | 0 | 1.2 | 0 |
| Processing oil | 10 | 10 | 10 |
| Antioxidant #1 | 1.5 | 1.5 | 1.5 |
| Stearic acid | 1.5 | 1.5 | 1.5 |
| Master-Batch #2 | | | |
| Carbon black | 10 | 10 | 10 |
| Whey protein component (acid whey) | 0 | 0 | 10 |
| Whey protein (from WPC) | 0 | 0 | 1.2 |
| Antioxidant #2 | 0.95 | 0.95 | 0.95 |
| Final Batch | | | |
| Vulcanization activator (Zinc oxide) | 2 | 2 | 2 |
| Vulcanizing agent (sulfur) | 2.1 | 2.1 | 2.1 |
| Vulcanization accelerators | 1.65 | 1.65 | 1.65 |

[1]High-cis polybutadiene (cis-bond content 96%)
[2]commercially available silica filler having a surface area ($N_2SA$) of about 190-210 $m^2/g$
[3]commercially available mercapto-group containing silica coupling agent
*denotes control (with respective test values listed to the right of each control)

TABLE 1D

| Property | 1-1, 0% silane, 0 phr WPC | 1-2, 0% silane, 5 phr WPC | 1-3, 0% silane, 10 phr WPC | 1-4, 4% silane, 0 phr WPC | 1-5, 4% silane, 5 phr WPC | 1-6, 4% silane, 10 phr WPC | 1-7, 8% Silane, 0 phr WPC | 1-8, 8% silane, 5 phr WPC | 1-9, 8% silane, 10 phr WPC |
|---|---|---|---|---|---|---|---|---|---|
| Indexed M300 | — | — | — | 1.00 | 0.87 | 0.81 | 1.00 | 0.83 | 0.73 |
| Indexed Tb | — | — | — | 1.00 | 0.76 | 0.66 | 1.00 | 0.80 | 0.63 |
| Indexed Eb | — | — | — | 1.00 | 0.94 | 0.94 | 1.00 | 1.02 | 0.93 |
| Indexed tan δ 0° C. | — | — | — | 1.00 | 1.14 | 1.18 | 1.00 | 1.04 | 1.12 |
| Indexed tan δ 30° C. | — | — | — | 1.00 | 1.17 | 1.00 | 1.00 | 1.10 | 1.19 |
| Indexed E' 30° C. | — | — | — | 1.00 | 1.00 | 0.94 | 1.00 | 1.06 | 0.95 |
| Indexed tan δ 60° C. | — | — | — | 1.00 | 1.12 | 1.24 | 1.00 | 1.22 | 1.28 |
| RPA viscosity | 132 | 86 | 75 | 100 | 78 | 71 | 81 | 69 | 66 |
| Indexed viscosity | 1.00 | 0.65 | 0.57 | 1.00 | 0.78 | 0.71 | 1.00 | 0.85 | 0.81 |

— measurement not obtained

TABLE 2D

| Property | 2-1, 0% silane, 0 phr WPC | 2-2, 0% silane, 5 phr WPC | 2-3, 0% silane, 10 phr WPC | 2-4, 4% silane, 0 phr WPC | 2-5, 4% silane, 5 phr WPC | 2-6, 4% silane, 10 phr WPC | 2-7, 8% Silane, 0 phr WPC | 2-8, 8% silane, 5 phr WPC | 2-9, 8% silane, 10 phr WPC |
|---|---|---|---|---|---|---|---|---|---|
| Indexed M300 | 1.00 | 0.80 | 0.90 | 1.00 | 0.87 | 0.81 | 1.00 | 0.84 | 0.73 |
| Indexed Tb | 1.00 | 0.83 | 0.69 | 1.00 | 0.73 | 0.62 | 1.00 | 0.78 | 0.65 |
| Indexed Eb | 1.00 | 1.08 | 0.93 | 1.00 | 0.92 | 0.89 | 1.00 | 1.00 | 0.98 |
| Indexed tan δ 0° C. | 1.00 | 1.10 | 1.05 | 1.00 | 1.20 | 1.20 | 1.00 | 1.07 | 1.05 |
| Indexed tan δ 30° C. | 1.00 | 1.09 | 1.15 | 1.00 | 1.15 | 1.23 | 1.00 | 1.10 | 1.16 |
| Indexed E' 30° C. | 1.00 | 1.09 | 1.33 | 1.00 | 0.87 | 1.05 | 1.00 | 1.06 | 1.10 |
| Indexed tan δ 60° C. | 1.00 | 1.08 | 1.21 | 1.00 | 1.17 | 1.30 | 1.00 | 1.19 | 1.28 |
| RPA viscosity | 117 | 86 | 77 | 97 | 70 | 67 | 70 | 62 | 62 |
| Indexed viscosity | 1.00 | 0.74 | 0.66 | 1.00 | 0.72 | 0.69 | 1.00 | 0.89 | 0.89 |

TABLE 3D

| Property | 3-1, 0% silane, 0 phr WPC | 3-2, 0% silane, 5 phr WPC | 3-3, 0% silane, 10 phr WPC | 3-4, 4% silane, 0 phr WPC | 3-5, 4% silane, 5 phr WPC | 3-6, 4% silane, 10 phr WPC | 3-7, 8% Silane, 0 phr WPC | 3-8, 8% silane, 5 phr WPC | 3-9, 8% silane, 10 phr WPC |
|---|---|---|---|---|---|---|---|---|---|
| Indexed M300 | 1.00 | 0.67 | 0.62 | 1.00 | 0.57 | 0.61 | 1.00 | 0.61 | 0.61 |
| Indexed Tb | 1.00 | 1.25 | 1.00 | 1.00 | 0.99 | 0.88 | 1.00 | 0.78 | 0.64 |
| Indexed Eb | 1.00 | 1.67 | 1.59 | 1.00 | 1.48 | 1.35 | 1.00 | 1.28 | 1.14 |
| Indexed tan δ 0° C. | 1.00 | 1.18 | 1.23 | 1.00 | 1.32 | 1.33 | 1.00 | 1.28 | 1.24 |
| Indexed tan δ 30° C. | 1.00 | 1.18 | 1.27 | 1.00 | 1.33 | 1.37 | 1.00 | 1.30 | 1.30 |
| Indexed E' 30° C. | 1.00 | 0.82 | 1.10 | 1.00 | 0.63 | 0.76 | 1.00 | 0.77 | 0.77 |
| Indexed tan δ 60° C. | 1.00 | 1.23 | 1.36 | 1.00 | 1.35 | 1.45 | 1.00 | 1.35 | 1.40 |
| RPA viscosity | 133 | 87 | 76 | 114 | 82 | 74 | 93 | 67 | 66 |
| Indexed viscosity | 1.00 | 0.65 | 0.57 | 1.00 | 0.72 | 0.65 | 1.00 | 0.72 | 0.71 |

TABLE 4D

| Property | 4-1, 0% silane, 0 phr WPC | 4-2, 0% silane, 5 phr WPC | 4-3, 0% silane, 10 phr WPC | 4-4, 4% silane, 0 phr WPC | 4-5, 4% silane, 5 phr WPC | 4-6, 4% silane, 10 phr WPC | 4-7, 8% Silane, 0 phr WPC | 4-8, 8% silane, 5 phr WPC | 4-9, 8% silane, 10 phr WPC |
|---|---|---|---|---|---|---|---|---|---|
| Indexed M300 | 1.00 | 0.69 | 0.61 | 1.00 | 0.72 | 0.74 | 1.00 | 0.80 | 0.74 |
| Indexed Tb | 1.00 | 0.98 | 1.02 | 1.00 | 1.44 | 1.22 | 1.00 | 1.01 | 0.90 |
| Indexed Eb | 1.00 | 1.38 | 1.57 | 1.00 | 1.73 | 1.45 | 1.00 | 1.13 | 1.13 |
| Indexed tan δ 0° C. | 1.00 | 1.05 | 1.12 | 1.00 | 1.23 | 1.35 | 1.00 | 1.10 | 1.09 |
| Indexed tan δ 30° C. | 1.00 | 1.14 | 1.25 | 1.00 | 1.12 | 1.11 | 1.00 | 0.92 | 0.97 |
| Indexed E' 30° C. | 1.00 | 0.92 | 0.87 | 1.00 | 0.63 | 0.49 | 1.00 | 0.74 | 0.84 |
| Indexed tan δ 60° C. | 1.00 | 1.15 | 1.28 | 1.00 | 1.11 | 1.02 | 1.00 | 0.94 | 1.01 |
| RPA viscosity | 120 | 91 | 73 | 102 | 80 | 72 | 79 | 83 | 75 |
| Indexed viscosity | 1.00 | 0.76 | 0.61 | 1.00 | 0.78 | 0.71 | 1.00 | 1.05 | 0.95 |

TABLE 5D

| Property | 5-1, 0% silane, 0 phr WPC | 5-2, 0% silane, 5 phr WPC | 5-3, 0% silane, 10 phr WPC | 5-4, 4% silane, 0 phr WPC | 5-5, 4% silane, 5 phr WPC | 5-6, 4% silane, 10 phr WPC | 5-7, 8% Silane, 0 phr WPC | 5-8, 8% silane, 5 phr WPC | 5-9, 8% silane, 10 phr WPC |
|---|---|---|---|---|---|---|---|---|---|
| Indexed M300 | 1.00 | 0.99 | 1.02 | 1.00 | 1.00 | 0.90 | 1.00 | 1.0 | 0.90 |
| Indexed Tb | 1.00 | 0.83 | 0.69 | 1.00 | 0.73 | 0.62 | 1.00 | 0.78 | 0.65 |
| Indexed Eb | 1.00 | 0.92 | 0.91 | 1.00 | 0.97 | 0.94 | 1.00 | 0.93 | 0.91 |
| Indexed tan δ 0° C. | 1.00 | 1.24 | 1.30 | 1.00 | 1.22 | 1.28 | 1.00 | 1.11 | 1.14 |
| Indexed tan δ 30° C. | 1.00 | 1.19 | 1.26 | 1.00 | 1.19 | 1.23 | 1.00 | 1.04 | 1.12 |
| Indexed E' 30° C. | 1.00 | 0.76 | 0.86 | 1.00 | 0.75 | 0.70 | 1.00 | 0.69 | 0.87 |
| Indexed tan δ 60° C. | 1.00 | 1.23 | 1.39 | 1.00 | 1.23 | 1.31 | 1.00 | 1.08 | 1.18 |
| RPA viscosity | 111 | 86 | 72 | 103 | 76 | 66 | 84 | 68 | 65 |
| Indexed viscosity | 1.00 | 0.77 | 0.65 | 1.00 | 0.74 | 0.64 | 1.00 | 0.81 | 0.77 |

TABLE 6D

| Property | 6-1, 0% silane, 0 phr WPC | 6-2, 0% silane, 5 phr WPC | 6-3, 0% silane, 10 phr WPC | 6-4, 4% silane, 0 phr WPC | 6-5, 4% silane, 5 phr WPC | 6-6, 4% silane, 10 phr WPC | 6-7, 8% Silane, 0 phr WPC | 6-8, 8% silane, 5 phr WPC | 6-9, 8% silane, 10 phr WPC |
|---|---|---|---|---|---|---|---|---|---|
| Indexed M300 | — | — | — | 1.00 | 0.96 | 0.87 | 1.00 | 0.95 | 0.76 |
| Indexed Tb | — | — | — | 1.00 | 0.86 | 0.74 | 1.00 | 0.94 | 0.76 |
| Indexed Eb | — | — | — | 1.00 | 0.99 | 0.98 | 1.00 | 1.00 | 1.02 |
| Indexed tan δ 0° C. | 1.00 | 1.15 | 1.30 | 1.00 | 1.19 | 1.18 | 1.00 | 1.03 | 1.05 |
| Indexed tan δ 30° C. | 1.00 | 1.14 | 1.24 | 1.00 | 1.08 | 1.15 | 1.00 | 0.97 | 1.04 |
| Indexed E' 30° C. | 1.00 | 0.92 | 0.76 | 1.00 | 0.64 | 0.76 | 1.00 | 0.86 | 1.06 |
| Indexed tan δ 60° C. | 1.00 | 1.18 | 1.36 | 1.00 | 1.12 | 1.28 | 1.00 | 1.02 | 1.16 |
| RPA viscosity | 98 | 78 | 75 | 78 | 68 | 64 | 61 | 60 | 59 |
| Indexed viscosity | 1.00 | 0.80 | 0.77 | 1.00 | 0.87 | 0.82 | 1.00 | 0.98 | 0.97 |

— measurement not obtained

TABLE 7D

| Property | 7-1, 56 phr PT silica, 0 phr WPC | 7-2, 56 phr PT silica, 5 phr WPC | 7-3, 56 phr PT silica, 10 phr WPC | 7-4, 80 phr PT silia, 0 phr WPC | 7-5, 80 phr PT silica, 5 phr WPC | 7-6, 80 phr PT silica, 10 phr WPC |
|---|---|---|---|---|---|---|
| Indexed M300 | — | — | — | — | — | — |
| Indexed Tb | — | — | — | — | — | — |
| Indexed Eb | — | — | — | — | — | — |
| Indexed tan δ 0° C. | 1.00 | 0.94 | 0.91 | 1.00 | 0.92 | 0.84 |
| Indexed tan δ 30° C. | 1.00 | 1.03 | 1.00 | 1.00 | 1.03 | 1.03 |
| Indexed E' 30° C. | 1.00 | 1.03 | 1.39 | 1.00 | 1.18 | 1.40 |
| Indexed tan δ 60° C. | 1.00 | 1.36 | 1.29 | 1.00 | 1.29 | 1.35 |
| RPA viscosity | 63 | 58 | 56 | 64 | 62 | 57 |
| Indexed viscosity | 1.00 | 0.92 | 0.89 | 1.00 | 0.97 | 0.89 |

— measurement not obtained

TABLE 8D

| Property | 8-1 | 8-2 | 8-3 | 8-4 |
|---|---|---|---|---|
| Indexed M300 | 1.00 | 0.89 | 0.91 | 1.09 |
| Indexed Tb | 1.00 | 0.77 | 0.88 | 1.00 |
| Indexed Eb | 1.00 | 0.99 | 0.97 | 0.96 |
| Indexed tan δ 0° C. | 1.00 | 1.04 | 1.09 | 1.00 |
| Indexed tan δ 30° C. | 1.00 | 1.00 | 1.05 | 1.00 |
| Indexed E' 30° C. | 1.00 | 0.96 | 0.98 | 1.10 |
| Indexed tan δ 60° C. | 1.00 | 1.06 | 1.11 | 1.00 |
| RPA viscosity | 73 | 65 | 69 | 64 |
| Indexed viscosity | 1.00 | 0.89 | 0.95 | 0.88 |

TABLE 9D

| Property | 9-1, no WPC | 9-2, WPC 1st MB | 9-3, WPC 2nd MB |
|---|---|---|---|
| Indexed M300 | 1.00 | 0.77 | 0.69 |
| Indexed Tb | 1.00 | 0.78 | 0.77 |
| Indexed Eb | 1.00 | 0.98 | 1.04 |
| Indexed tan δ 0° C. | 1.00 | 1.24 | 1.10 |
| Indexed tan δ 30° C. | 1.00 | 1.31 | 1.25 |
| Indexed E' 30° C. | 1.00 | 0.79 | 1.15 |
| Indexed tan δ 60° C. | 1.00 | 1.33 | 1.33 |
| RPA viscosity | 87 | 84 | 77 |
| Indexed viscosity | 1.00 | 0.97 | 0.89 |

As is apparent from a review of the data in Tables 1D to 9D, the addition of whey protein results in rubber compositions with reduced viscosity. Lower viscosity results in improved processability for the rubber composition. As would be expected, at 0% whey protein, the viscosity of each rubber composition is reduced as the amount of silica coupling agent increases. Surprisingly, though, as whey protein is added to the rubber compositions, the viscosities of the low-silane compositions approach the viscosity of the high-silane composition. At a whey protein component concentration of 10 phr (1.2 phr whey protein), the rubber composition with 0% silane has essentially the same viscosity as the rubber composition with 4% silane. The rubber compositions with 10 phr whey protein component and either 0% or 4% silane have lower viscosities than the composition with 0 phr whey protein component and 8% silane, and these rubber compositions are only slightly more viscous than the rubber composition containing 10 phr whey protein component and 8% silane.

Examples 10 and 11

In Examples 10 and 11, rubber compositions containing reinforcing silica filler were prepared using various rubbers along with varying amounts of whey protein and either cellulose ester or starch filler. Example 10 utilizes natural rubber in combination with polybutadiene for the rubber component and Example 11 utilizes styrene-butadiene rubber in combination with polybutadiene for the rubber component. Moreover, in Example 10 the whey protein, cellulose ester, or both were added either in the first master batch or in the second master batch. The rubber compositions were prepared in a four stage mixing process (i.e., two master-batch stages, remilling, and final batch) according to the formulations shown in Tables 10A-11A. The amount of each ingredient used is reported as parts per hundred rubber (phr). The mixing process used for these formulations is outlined in Table 1B above. The whey protein component utilized in Examples 10 and 11 was acid whey (containing approximately 12 weight % protein). In Example 11, the whey protein, starch or both were added in the second master batch.

TABLE 10A

Rubber Formulations Containing Silica and Cellulose Ester

| Sample # | 10-1* | 10-2 | 10-3 | 10-4 | 10-5 | 10-6 | 10-7 | 10-8 | 10-9 |
|---|---|---|---|---|---|---|---|---|---|
| Master-Batch #1 | | | | | | | | | |
| Natural rubber | 80 | 80 | 80 | 80 | 80 | 80 | 80 | 80 | 80 |
| Polybutadiene[1] | 20 | 20 | 20 | 20 | 20 | 20 | 20 | 20 | 20 |
| Silica filler[2] | 56 | 56 | 56 | 56 | 56 | 56 | 56 | 56 | 56 |
| Silica coupling agent[3] | 2.24 | 2.24 | 2.24 | 2.24 | 2.24 | 2.24 | 2.24 | 2.24 | 2.24 |
| Silica coupling agent (% based on amount of silica) | 4 | 4 | 4 | 4 | 4 | 4 | 4 | 4 | 4 |

TABLE 10A-continued

Rubber Formulations Containing Silica and Cellulose Ester

| | Sample # | | | | | | | | |
|---|---|---|---|---|---|---|---|---|---|
| | 10-1* | 10-2 | 10-3 | 10-4 | 10-5 | 10-6 | 10-7 | 10-8 | 10-9 |
| Whey protein component (acid whey) | 0 | 10 | 0 | 10 | 10 | 0 | 0 | 0 | 0 |
| Whey protein (from WPC) | 0 | 1.2 | 0 | 1.2 | 1.2 | 0 | 0 | 0 | 0 |
| Cellulose ester[4] | 5 | 0 | 5 | 5 | 0 | 0 | 0 | 0 | 5 |
| Processing oil | 10 | 10 | 10 | 10 | 10 | 10 | 10 | 10 | 10 |
| Antioxidant #1 | 1.5 | 1.5 | 1.5 | 1.5 | 1.5 | 1.5 | 1.5 | 1.5 | 1.5 |
| Stearic acid | 1.5 | 1.5 | 1.5 | 1.5 | 1.5 | 1.5 | 1.5 | 1.5 | 1.5 |
| Master-Batch #2 | | | | | | | | | |
| Carbon black | 10 | 10 | 10 | 10 | 0 | 10 | 10 | 10 | 10 |
| Whey protein component (acid whey) | 0 | 0 | 0 | 0 | 0 | 10 | 0 | 10 | 10 |
| Whey protein (from WPC) | 0 | 0 | 0 | 0 | 0 | 1.2 | 0 | 1.2 | 1.2 |
| Cellulose ester[4] | 0 | 0 | 0 | 0 | 5 | 0 | 5 | 5 | 0 |
| Antioxidant #2 | 0.95 | 0.95 | 0.95 | 0.95 | 0.95 | 0.95 | 0.95 | 0.95 | 0.95 |
| Final Batch | | | | | | | | | |
| Vulcanization activator (Zinc oxide) | 2 | 2 | 2 | 2 | 2 | 2 | 2 | 2 | 2 |
| Vulcanizing agent (sulfur) | 2.1 | 2.1 | 2.1 | 2.1 | 2.1 | 2.1 | 2.1 | 2.1 | 2.1 |
| Vulcanization accelerators | 1.65 | 1.65 | 1.65 | 1.65 | 1.65 | 1.65 | 1.65 | 1.65 | 1.65 |

[1]High-cis polybutadiene (cis-bond content 96%)
[2]commercially available silica filler having a surface area ($N_2SA$) of about 190-210 $m^2/g$
[3]commercially available trialkoxydisulfide type (bis(triethoxysilylpropyl)disulfide) silica coupling agent
[4]Cellulose acetate butyrate from Eastman™ Chemical Company (product number CAB 381).
*denotes control

TABLE 11A

Rubber Formulations Containing Silica and Starch

| | Sample # | | | |
|---|---|---|---|---|
| | 11-1* | 11-2 | 11-3 | 11-4 |
| Master-Batch #1 | | | | |
| Natural rubber | 80 | 80 | 80 | 80 |
| Polybutadiene[1] | 20 | 20 | 20 | 20 |
| Silica filler[2] | 56 | 56 | 56 | 56 |
| Silica coupling agent[3] | 4.48 | 4.48 | 4.48 | 4.48 |
| Silica coupling agent (% based on amount of silica) | 8 | 8 | 8 | 8 |
| Processing oil | 10 | 10 | 10 | 10 |
| Antioxidant #1 | 1.5 | 1.5 | 1.5 | 1.5 |
| Stearic acid | 1.5 | 1.5 | 1.5 | 1.5 |
| Master-Batch #2 | | | | |
| Carbon black | 10 | 10 | 10 | 10 |
| Whey protein component (acid whey) | 0 | 5 | 0 | 5 |
| Whey protein (from WPC) | 0 | 0.6 | 0 | 0.6 |
| Starch[4] | 0 | 0 | 15 | 15 |
| Final Batch | | | | |
| Vulcanization activator (Zinc oxide) | 2 | 2 | 2 | 2 |
| Vulcanizing agent (sulfur) | 2.1 | 2.1 | 2.1 | 2.1 |
| Vulcanization accelerators | 1.65 | 1.65 | 1.65 | 1.65 |

[1]High-cis polybutadiene (cis-bond content 96%)
[2]commercially available silica filler having a surface area ($N_2SA$) of about 190-210 $m^2/g$
[3]commercially available (bis(triethoxysilylpropyl)disulfide) silica coupling agent
[4]Potato starch from Hoogwegt U.S., Inc. (Lake Forest, Illinois)
*denotes control After curing, each of the rubber compositions was tested for various properties according to the procedures described above for Examples 1-9. Results are reported in Tables 10D and 11D below. The index values listed in Tables 10D-11D were determined by comparing the value for the formulation according to the present disclosure with the respective value for the control (i.e., dividing the test value by the control value).

TABLE 10D

| Property | 10-1 | 10-2 | 10-3 | 10-4 | 10-5 | 10-6 | 10-7 | 10-8 | 10-9 |
|---|---|---|---|---|---|---|---|---|---|
| Indexed M300 | 1.00 | 0.77 | 0.93 | 0.68 | 0.69 | 0.97 | 0.54 | 0.60 | 0.61 |
| Indexed Tb | 1.00 | 0.78 | 0.88 | 0.69 | 0.77 | 1.06 | 0.61 | 0.61 | 0.46 |
| Indexed Eb | 1.00 | 0.98 | 0.97 | 1.06 | 1.04 | 1.09 | 1.11 | 0.98 | 0.83 |
| Indexed tan δ 0° C. | 1.00 | 1.25 | 1.11 | 1.32 | 1.12 | 1.13 | 1.19 | 1.29 | 1.26 |
| Indexed tan δ 30° C. | 1.00 | 1.28 | 1.12 | 1.37 | 1.23 | 1.11 | 1.31 | 1.34 | 1.37 |
| Indexed E' 30° C. | 1.00 | 0.79 | 0.91 | 0.87 | 1.15 | 0.99 | 1.14 | 0.82 | 0.84 |
| Indexed tan δ 60° C. | 1.00 | 1.35 | 1.16 | 1.45 | 1.35 | 1.11 | 1.46 | 1.45 | 1.49 |
| RPA viscosity | 87.3 | 84.0 | 92.4 | 74.4 | 77.0 | 84.3 | 73.8 | 75.0 | 78.9 |
| Indexed viscosity | 1.00 | 0.96 | 1.06 | 0.85 | 0.88 | 0.97 | 0.85 | 0.86 | 0.90 |

TABLE 11D

| Property | 11-1 | 11-2 | 11-3 | 11-4 |
|---|---|---|---|---|
| Indexed M300 | 1.00 | 0.83 | 1.01 | 0.91 |
| Indexed Tb | 1.00 | 0.73 | 0.88 | 0.72 |
| Indexed Eb | 1.00 | 0.92 | 0.92 | 0.89 |
| Indexed tan δ 0° C. | 1.00 | 1.01 | 1.00 | 1.01 |
| Indexed tan δ 30° C. | 1.00 | 1.08 | 1.01 | 1.07 |
| Indexed E' 30° C. | 1.00 | 1.14 | 1.11 | 1.16 |
| Indexed tan δ 60° C. | 1.00 | 1.13 | 1.00 | 1.14 |
| Indexed ML | 1.00 | 0.77 | 1.14 | 0.84 |
| Indexed MH | 1.00 | 0.80 | 1.04 | 0.82 |
| Indexed ΔM | 1.00 | 0.80 | 0.99 | 0.81 |
| RPA viscosity | 80.1 | 71.6 | 78.9 | 74.7 |
| Indexed viscosity | 1.00 | 0.89 | 0.98 | 0.93 |

As can be seen from the data in Table 10D, the addition of cellulose ester alone (i.e., without any whey protein) in Examples 10-3 and 10-7 resulted in a decrease in viscosity when the cellulose ester was added in the second masterbatch stage but an increase in viscosity when the cellulose ester was added in the first masterbatch stage, both as compared to the control Example 10-1. The addition of whey protein alone (i.e., without any cellulose ester) in Examples 10-2 and 10-6 resulted in a decrease in viscosity as compared to the control Example 10-1. The addition of whey protein together with cellulose ester in Examples 10-4, 10-5, 10-8, and 10-9 also resulted in a decrease in viscosity as compared to the control Example 10-1; the magnitude of the decrease in viscosity depended upon the masterbatch stage in which each was added with relatively larger decreases occurring when whey protein and cellulose ester were added together (either in the first or second masterbatch stage). For the combined addition of whey protein and cellulose ester, the smallest decrease in viscosity occurred when whey protein was added in the second masterbatch stage and cellulose ester in the first masterbatch stage (Example 10-9). For the combined addition of whey protein and cellulose ester, the addition of whey protein in the first masterbatch (Examples 10-4 and 10-5) resulted in an increase in Eb as compared to the control Example 10-1 and as compared to the combined addition of whey protein and cellulose ester with the addition of whey protein the second masterbatch (Examples 10-8 and 10-9); the increase in Eb was not dependent upon when the cellulose ester was added. The addition of whey protein alone (Examples 10-2 and 10-6) without cellulose ester resulted in an increase or decrease in Tb depending upon whether the whey protein was added in the first or second masterbatch.

As can be seen from the data in Table 11D, the use of starch without any whey protein (Example 11-3) resulted in a slight decrease in viscosity as compared to the control (Example 11-1). The use of whey protein without any starch (Example 11-2) resulted in a decrease in viscosity as compared to the control (consistent with the data in Tables 1D-9D, as discussed above). The combined use of whey protein and starch (Example 11-4) resulted in a decrease in viscosity as compared to the control Example (11-1), although the decrease was less than that obtained by the use of whey protein alone (i.e., without any starch).

This application discloses several numerical range limitations that support any range within the disclosed numerical ranges, even though a precise range limitation is not stated verbatim in the specification, because the embodiments of the compositions and methods disclosed herein could be practiced throughout the disclosed numerical ranges. With respect to the use of substantially any plural or singular terms herein, those having skill in the art can translate from the plural to the singular or from the singular to the plural as is appropriate to the context or application. The various singular or plural permutations may be expressly set forth herein for sake of clarity.

It will be understood by those within the art that, in general, terms used herein, and especially in the appended claims are generally intended as "open" terms. For example, the term "including" should be interpreted as "including but not limited to," the term "having" should be interpreted as "having at least," the term "includes" should be interpreted as "includes but is not limited to." It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references, including but not limited to patents, patent applications, and non-patent literature are hereby incorporated by reference herein in their entirety.

While various aspects and embodiments of the compositions and methods have been disclosed herein, other aspects and embodiments will be apparent to those skilled in the art. The various aspects and embodiments disclosed herein are for purposes of illustration and are not intended to be limiting, with the true scope and spirit being indicated by the claims.

What is claimed is:
1. A rubber composition comprising:
 a. at least one rubber;
 b. reinforcing silica filler in an amount of about 5 to about 200 phr; and
 c. a whey protein component in an amount sufficient to provide about 0.1 to about 10 phr whey protein, wherein the whey protein meets all of the following:
- d. a majority of the protein chains in the whey protein have a molecular weight of greater than about 10 kDaltons;
- e. a majority of the proteins in the whey protein are a combination of alpha-lactalbumin and beta-lactoglobulin; and
- f. a degree of hydrolysis of less than 50%.

2. The rubber composition of claim 1, wherein the whey protein component is in an amount sufficient to provide about 0.5 to about 5 phr whey protein.

3. The rubber composition of claim 1, wherein the whey protein component comprises at least one of acid whey powder, reduced lactose whey, reduced minerals whey, sweet whey powder, whey protein concentrate, and whey protein isolate.

4. A rubber composition that has been subjected to curing, the rubber composition comprising:
- a. at least one rubber;
- b. reinforcing silica filler in an amount of about 5 to about 200 phr;
- c. whey protein in an amount of about 0.1 to about 10 phr; and
- d. a cure package, wherein the whey protein meets all of the following:
- e. a majority of the protein chains in the whey protein have a molecular weight of greater than about 10 kDaltons;
- f. a majority of the proteins in the whey protein are a combination of alpha-lactalbumin and beta-lactoglobulin; and
- g. a degree of hydrolysis of less than 50%.

5. The rubber composition of claim 4, wherein the amount of whey protein comprises about 0.5 to about 5 phr.

6. The rubber composition according to claim 4, wherein the composition further comprises cellulose ester.

7. The rubber composition according to claim 4, wherein the composition further comprises starch.

8. The rubber composition according to claim 4, wherein the reinforcing silica filler comprises pre-treated silica.

9. The rubber composition according to claim 4, further comprising about 0.5 to about 20 phr silica coupling agent, wherein the ratio of the total amount of silica coupling agent to silica comprises about 1:100 to about 1:5.

10. The rubber composition according to claim 4, wherein at least a majority (by weight) of the at least one rubber comprises at least one of: natural rubber, polyisoprene rubber, polybutadiene rubber, and styrene-butadiene rubber.

11. A tire tread or sidewall comprising the rubber composition of claim 4.

12. A tire containing at least one component comprising the rubber composition of claim 4.

13. A method for reducing the viscosity of a silica filler-containing rubber composition, the method comprising incorporating a whey protein powder component in an amount sufficient to provide about 0.1 to about 10 phr of whey protein into a rubber composition that comprises at least one rubber; and about 5 to about 200 phr reinforcing silica filler, wherein the whey protein meets all of the following:
- a. a majority of the protein chains in the whey protein have a molecular weight of greater than about 10 kDaltons;
- b. a majority of the proteins in the whey protein are a combination of alpha-lactalbumin and beta-lactoglobulin; and
- c. a degree of hydrolysis of less than 50%.

14. The method of claim 13, wherein the amount of whey protein comprises about 0.5 to about 5 phr.

15. The method of claim 13, further comprising incorporating cellulose ester.

16. The method of claim 13, further comprising incorporating starch.

17. The method of claim 13, wherein at least a majority (by weight) of the at least one rubber comprises at least one of: natural rubber, polyisoprene rubber, polybutadiene rubber, and styrene-butadiene rubber.

* * * * *